(12) United States Patent
Futamura et al.

(10) Patent No.: US 6,891,534 B2
(45) Date of Patent: May 10, 2005

(54) METHOD, APPARATUS, STORAGE MEDIUM, PROGRAM, AND PROGRAM PRODUCT FOR GENERATING IMAGE DATA OF VIRTUAL SPACE

(75) Inventors: Naohiro Futamura, Tokyo (JP); Seigo Kimura, Tokyo (JP)

(73) Assignee: Namco Ltd., Tokyo (JP)

( * ) Notice: Subject to any disclaimer, the term of this patent is extended or adjusted under 35 U.S.C. 154(b) by 284 days.

(21) Appl. No.: 10/096,797

(22) Filed: Mar. 14, 2002

(65) Prior Publication Data

US 2002/0140696 A1 Oct. 3, 2002

(30) Foreign Application Priority Data

Mar. 28, 2001 (JP) .......................................... 2001-94376

(51) Int. Cl.$^7$ .............................................. G06T 15/00
(52) U.S. Cl. ...................... 345/419; 345/474; 345/475; 345/672
(58) Field of Search ................................. 345/419, 473, 345/474, 475, 672; 463/30, 31, 32, 33

(56) References Cited

U.S. PATENT DOCUMENTS 5,966,129 A * 10/1999 Matsukuma et al. ........ 345/418
6,222,546 B1 * 4/2001 Yokoyama et al. ......... 345/418

FOREIGN PATENT DOCUMENTS

JP    A 11-39502      2/1999
JP    A 2000-225274   8/2000

* cited by examiner

Primary Examiner—Kimbinh T. Nguyen
(74) Attorney, Agent, or Firm—Oliff & Berridge, PLC

(57) ABSTRACT

A method for generating realistic image data of particle system objects locations of which change as time passes, in a light operation load and a little storage capacity. The method for generating image data of a virtual space viewed from a predetermined view point, comprises: providing a particle system object group comprising at least one particle system object in the virtual space, according to a predetermined rule, continuously or intermittently; determining a displacement point in the virtual space; moving the displacement point in a predetermined direction as time passes; and moving the particle system object group on the basis of the displacement point.

50 Claims, 23 Drawing Sheets

PRIOR ART  *FIG.2A*
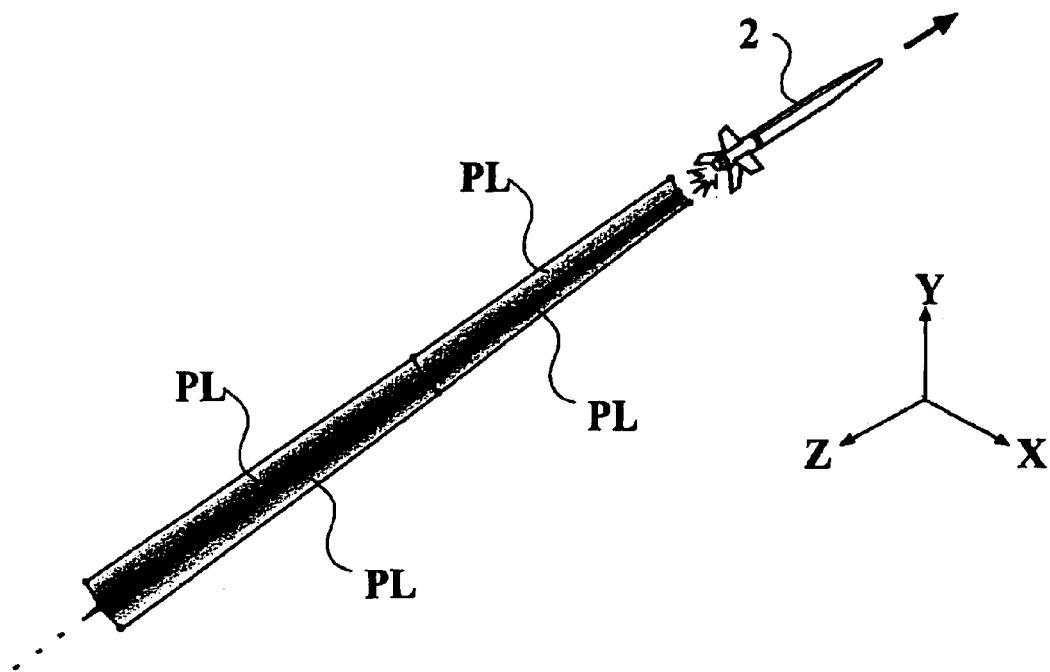
PRIOR ART  *FIG.2B*
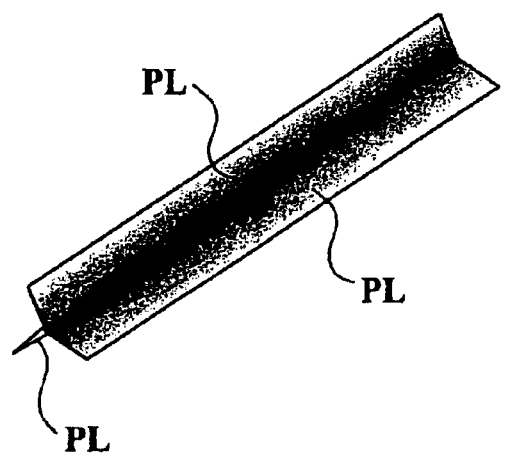

PRIOR ART FIG.3A
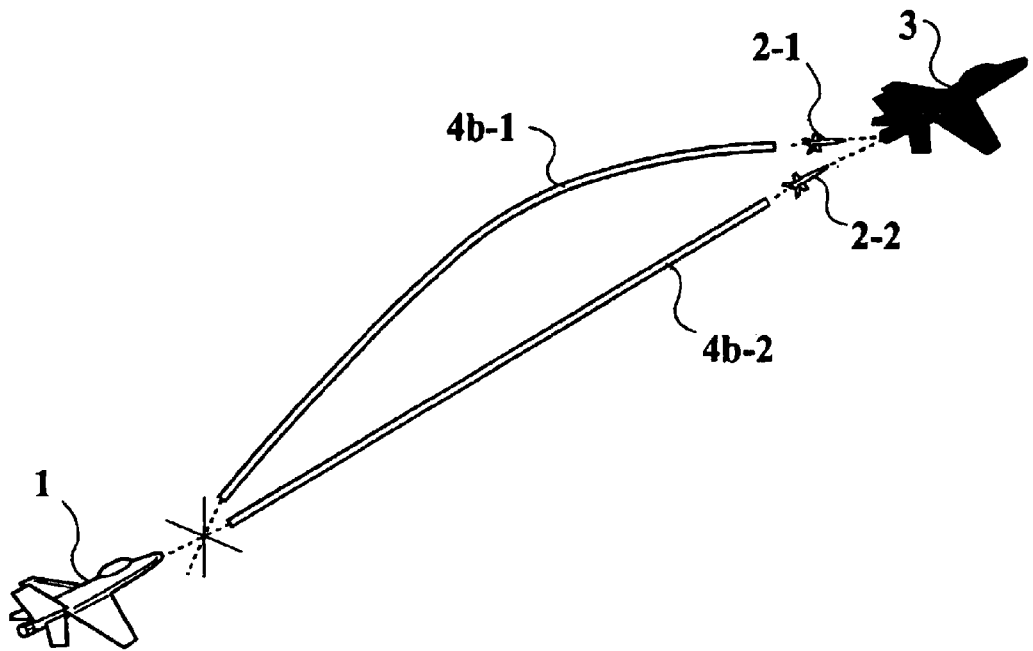
PRIOR ART FIG.3B
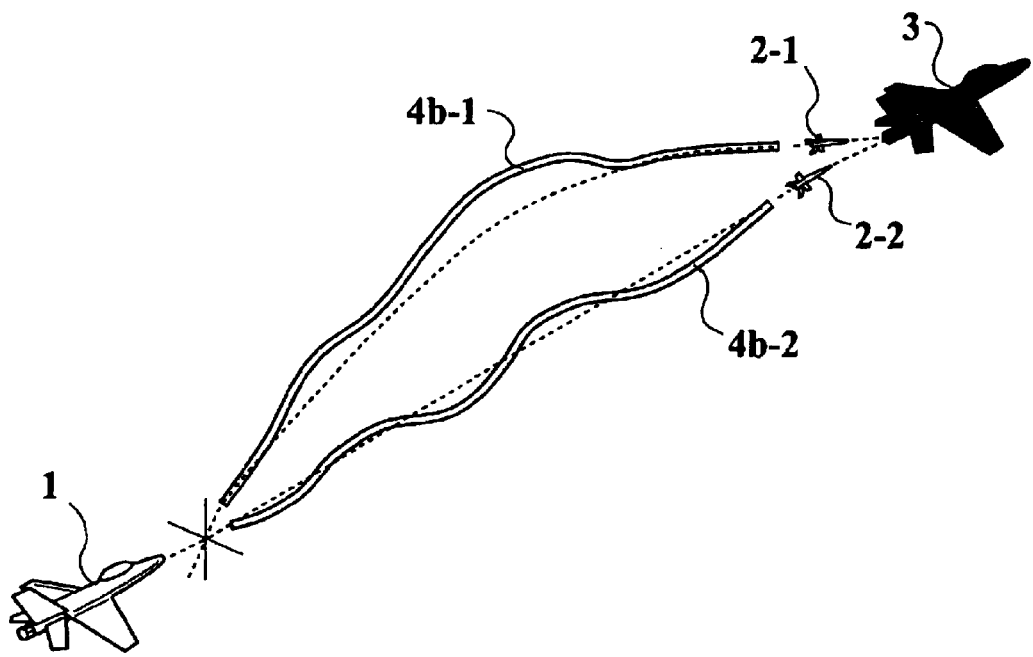

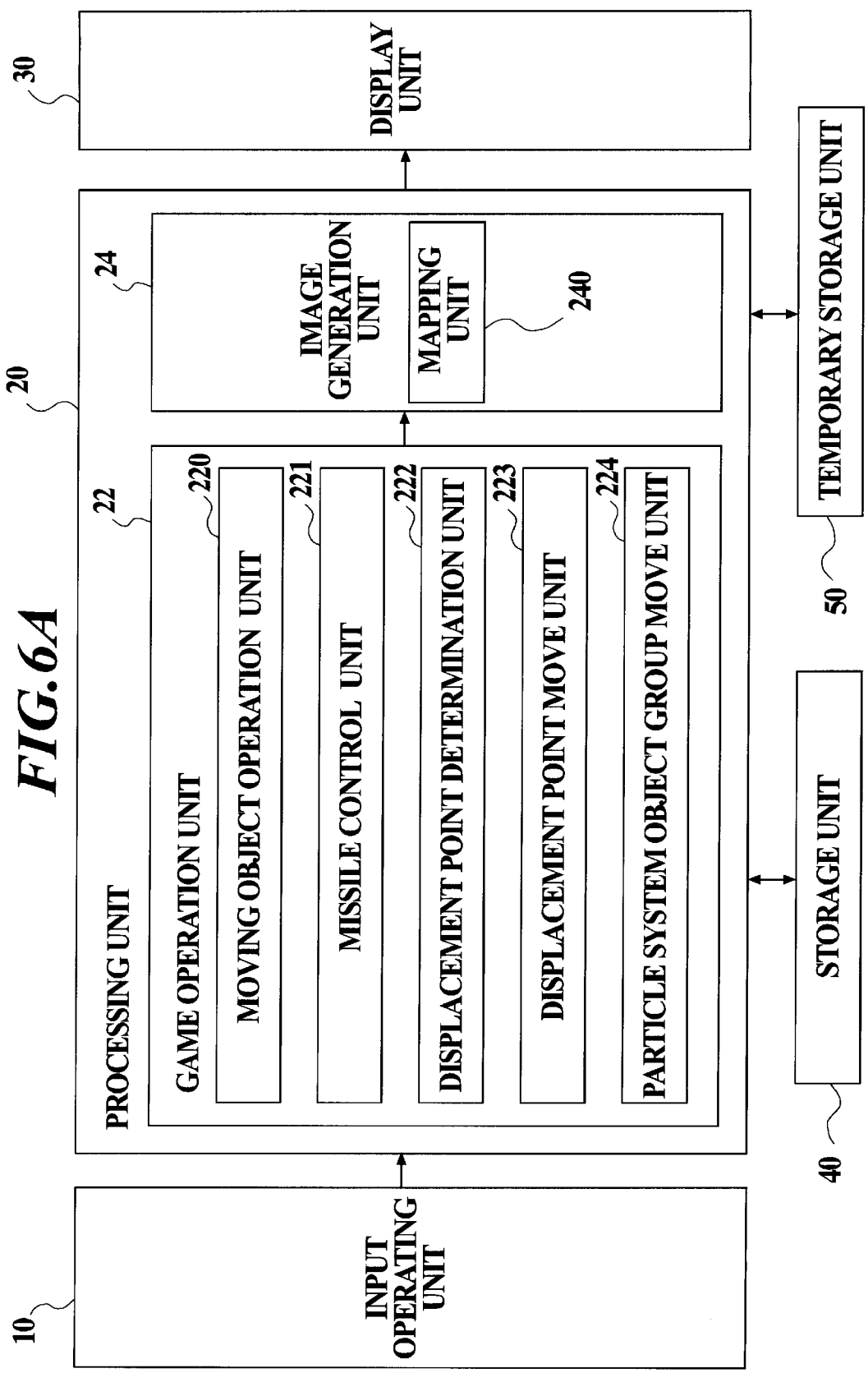

FIG.7

| MISSILE IDENTIFICATION NUMBER | COORDINATES | SPEED | ACCELERATION | ARRIVAL FLAG | |
|---|---|---|---|---|---|
| 1 | Pm1 | Vm1 | Am1 | 0 | ~511-1 |
| 2 | Pm2 | Vm2 | Am2 | 0 | ~511-2 |
| 3 | Pm3 | Vm3 | Am3 | 0 | |
| 4 | Pm4 | Vm4 | Am4 | 0 | |
| ⋮ | ⋮ | ⋮ | ⋮ | ⋮ | |
| n | | | | | |

| DISPLACEMENT POINT IDENTIFICATION NUMBER | COORDINATES | SPEED | ACCELERATION | LIFE VARIABLE |
|---|---|---|---|---|
| 3 | Pa3 | Va3 | Aa1 | 200 |
| 2 | Pa2 | Va2 | Aa1 | 120 |
| 1 | Pa1 | Va1 | Aa2 | 60 |
| ⋮ | ⋮ | ⋮ | ⋮ | ⋮ |

| DISTANCE | NUMBER OF INTERPOLATION SHEETS | INTERPOLATION FUNCTION |
|---|---|---|
| SECTION 1 | 100 | f1 (x, y, z) |
| SECTION 2 | 95 | f2 (x, y, z) |
| SECTION 3 | 90 | f3 (x, y, z) |
| SECTION 4 | 85 | f4 (x, y, z) |
| ⋮ | ⋮ | ⋮ |

~426

METHOD, APPARATUS, STORAGE MEDIUM, PROGRAM, AND PROGRAM PRODUCT FOR GENERATING IMAGE DATA OF VIRTUAL SPACE

BACKGROUND OF THE INVENTION

1. Field of the Invention

The invention relates a method, an apparatus, a storage medium, a program, and a program product for generating image data of a virtual space viewed from a predetermined view point, to execute a predetermined game in an apparatus which is operated and controlled by a processor.

2. Description of Related Art

Conventionally, a game apparatus for providing a plurality of objects in an object space as a virtual three dimensional space, and for generating image data viewed from a predetermined view point in the object space, is known. The game apparatus is popular as a game apparatus for providing a so-called virtual reality to a player. For example, in case of a player enjoys piloting an own fighter plane with a game apparatus, the player enjoys making the own fighter plane (Hereinafter, it will be called a player plane.) controlled the player fly in the object space, and fighting with another fighter plane (Hereinafter, it will be called a target plane.) controlled by another player or a computer.

When the above-described game apparatus generates more realistic image data, the virtual reality of the predetermined game is improved. Therefore, the player can devote himself to the game and enjoy playing the game.

For example, as indicated in a game screen shown in FIG. 1, in accordance with a moving object such as a target plane 3 , a missile 2 fired at the target plane 3 and so on, a phenomenon of a particle system, such as a condensation trail 4a, a smoke 4b emitted from a missile propeller and so on, is represented. The above-described particle system object generated so as to attach to or follow the moving object is one of important factors in making the player feel speed of the player plane 1 and tension caused by the missile 2 fired at the target plane 3. Therefore, in order to improve a quality of the game, it has been an important technical object to generate more realistic image data of particle system objects in as light an operation load as possible and in as little a storage capacity as possible.

One of algorithms of generating image data of particle system objects such as a condensation trial and so on, according to an earlier development, is disclosed in, for example, Japanese Patent Application Publication No. Tokukai 2000-225274.

In the publication, as shown in FIG. 2A, one or a plurality of quadrilateral polygons PL are provided on a trail of the moving object such as the missile 2 and so on. As shown in FIG. 2B, the polygons PL are designed so that a characteristic color of each of the polygons PL is changed lighter and lighter toward an outer edge. Thereby, the polygons PL look not a mere quadrilateral, but as if they were a line which is a gathering of fogs.

Then, positional coordinates and speeds of the polygons PL are stored in an apparatus, and the apparatus generates image data of the polygons PL at predetermined frames. Thereby, the apparatus expresses a state the condensation trail and the smoke are generated with trails and left for some time.

However, although the particle system object itself such as the condensation trail, the smoke and so on, is realistically represented according to the above-described algorithm, it is impossible to say that the motion of the particle system object is represented sufficiently.

For example, in case of the fly of the missile, as shown in FIG. 3B, because real missiles 2-1 and 2-2 fired from the player plane 1 fly to the target plane 3 with controlling postures thereof respectively, the postures of the missiles 2-1 and 2-2 are always swung upward, downward, rightward and leftward. Therefore, the smokes 4b-1 and 4b-2 emitted from the missile propellers of the missiles 2-1 and 2-2 are affected by the postures of the missiles 2-1 and 2-2 when the smokes are emitted, and have speeds in various directions. As a result, although the smokes 4b-1 and 4b-2 float along the trail of the missiles 2-1 and 2-2 when the smokes are emitted, the smokes 4b-1 and 4b-2 move in random directions as time passes from diffusion to disappearance. When the smokes 4b-1 and 4b-2 are observed from far, the trails of the smokes 4b-1 and 4b-2 look like winding. In particular, at circular positions of the missiles 2-1 and 2-2, the phenomena that the smokes 4b-1 and 4b-2 flow with winding in opposite directions to the circular directions are caused.

However, according to the algorithm disclosed in the above-described publication, the motion itself of the smoke is taken into consideration. Therefore, as shown in FIG. 3A, the unnatural state the smokes 4b-1 and 4b-2 are generated exactly along the condensation trails and keep the generated shapes to disappearance, is represented. As a result, naturally, regardless of the exciting scene the missiles 2-1 and 2-2 fly to the target plane 3, there is a problem a player feel the expression of the game simple, and the player cannot feel quite satisfactory realistic and be excited.

SUMMARY OF THE INVENTION

The present invention was developed in view of the above-described problems.

It is an object of the present invention to generate realistic image data of particle system objects locations of which change as time passes, in a light operation load and a little storage capacity.

In accordance with a first aspect of the present invention, a method for generating image data of a virtual space viewed from a predetermined view point, comprises:

providing a particle system object group comprising at least one particle system object in the virtual space, according to a predetermined rule, continuously or intermittently;

determining a displacement point in the virtual space;

moving the displacement point in a predetermined direction as time passes; and moving the particle system object group on the basis of the displacement point.

Herein, a particle means one of components composing a smoke, a cloud, a bubble or the like. Further, the particle is not limited to actual one. The particle may be imaginary one, effect expressive one or the like such as a magic powder of a fairy, a star dust as an expression of magic effects and so on. The particle system object means one represented as a smoke, a cloud, a star or the like composed by more than one particle. Further, the particle system object is represented so that a predetermined characteristic color is supplied thereto, a predetermined texture is mapped thereon, and so on. The particle system object group is composed by at least one particle system object, and provided in the object space.

According to the method of the first aspect of the present invention, the particle system object group is suitably provided according a represented object such as a condensation trail, a smoke of a missile and so on, and the displacement point representing a move of the particle system object group is determined. It is not limited that the relationship between the displacement point and the particle system object group is 1 to 1. That is, one or a predetermined number of displacement points may be corresponded to the particle system object group as the occasion may demand. Further, the displacement point are moved in a predetermined direction according to various external factors, for example, an influence of a swing of the posture of the missile, a wind or the like, as time passes (for example, for every frame).

That is, because the particle system object group is moved on the basis of the position of the moved displacement point, it is possible to realistically represent as if the particle system object group such as a smoke of a missile, a condensation trail and so on winds under the influence of the swing of the posture of the missile or the wind, or flows before the wind.

Generally, in order to realistically represent the state the particle system object group moves under the influence of a fluid phenomenon such as a wind and so on, as time passes, a heavy operation load is required. Therefore, when a large number of particle system object groups are provided, there is a trouble in executing a predetermined game. However, because the processing requiring the heavy operation load is performed only to the displacement point which is a representative point of the particle system object group, it is possible to performing the processing in a far light operation load in comparison with the case of performing the processing to each of particle system objects composing the particle system object group.

Further, in order to apply the present invention, the capacity of the storage medium which is newly added and used is one in which positional coordinates, a moving speed and so on of the displacement point are stored. Therefore, a far little storage capacity is sufficient as compared with one for storing positional coordinates, a moving speed and so on of each particle system object group.

Consequently, it is possible to more realistically represent the particle system object group such as a cloud, a smoke and so on in a light operation load and a little used storage capacity.

Preferably, the method of the first aspect of the present invention, further comprises: providing the particle system object group so as to attach to or follow a moving object moving in the virtual space.

Herein, the moving object means various types of objects moving in the object space, such as the above-described fighter plane including the player plane and the target plane, the missile, a ship sailing on a water, a vehicle driving on a road and so on. Further, it is unnecessary that the moving object always moves. The moving object may stop as the occasion may demand. In case the moving speed is 0, the moving object may be a chimney, a muffler of a vehicle while stopping or the like.

According to the above-described method, the particle system object group is provided at a suitable position so as to follow the moving object, on the basis of various moving object control data such as positional coordinates, a speed, an acceleration and so on of the moving object. Consequently, it is possible to represent the state the particle system object group is generated so as to follow the moving object and moves as time passes.

For example, in case of the fly of the missile, if corresponding positional coordinates to back of a propeller of the missile are determined on the basis of positional coordinates of the missile (moving object), and a smoke (particle system object group) is provided at the determined positional coordinates, it is possible to represent as if the smoke were emitted from the propeller of the missile, so as to follow the missile with a trail. Further, if vapor are provided behind both wing edges of main wings on the basis of positional coordinates of the fighter plane, it is possible to represent a vapor trail trailing by the wing edges.

Preferably, the method as described above, further comprises: determining the displacement point on the basis of a position of the moving object at predetermined time intervals.

According to the above-described method, the displacement point is provided at a suitable position so as to follow the moving object on the basis of various moving object control data such as positional coordinates, a speed, an acceleration and so on of the moving object. Thereafter, because the particle system object group is moved, it is possible to represent as if the particle system object group were generated so as to follow the moving object on the basis of the position of the displacement point, and moved as time passed.

For example, in case of the fly of the missile, corresponding positional coordinates to a back of a propeller of the missile are determined on the basis of positional coordinates of the missile, and the displacement point is provided at the determined positional coordinates. The displacement point is generated on a trail of the missile one after another, at predetermined time intervals, and moved as time passes. Accordingly, because the particle system object group of the smoke is provided on the basis of the displacement point, it is possible to realistically represent the trail of the smoke which is generated so as to have a lasting effect behind the missile and winds as time passes.

Preferably, the method as described above, further comprises: determining the predetermined direction to be at least a substantially vertical direction to a moving direction of the moving object at the displacement point, to move the displacement point in the predetermined direction.

According to the above-described method, various external factors influencing a posture of the moving object during the move is regarded as a move in the substantially vertical direction to the moving direction of the moving object. Consequently, in case the moving direction of the moving object changes, it is possible to effectively determine the predetermined direction of the displacement point by determining a substantially vertical directional speed component of the moving object at random and compounding the substantially vertical directional speed component and the moving directional speed component of the moving object.

For example, in case of the fly of the missile, because a posture of the missile is controlled, the posture look like swinging upward, downward, rightward and leftward, at random. Therefore, the substantially vertical direction is determined at random, the moving distance is determined at random, and the displacement point is moved in the determined direction at the determined distance. Thereafter, the particle system object group is moved on the basis of the moved displacement point. Consequently, it is possible to realistically represent the trail of the smoke diffused in a random direction as time passes so as to show as if the smoke were emitted from the missile so as to have a lasting effect and the posture of the missile were controlled.

Preferably, the method as described above, further comprises: changing at least one of providing one particle system object group or a predetermined number of particle system object groups, a size of the particle system object group, and a transparency of the particle system object group, on the basis of at least one of a position, a moving speed, a moving direction and a type of the moving object, to provide the particle system object group or the predetermined number of particle system object groups.

According to the above-described method, at least one of the number, the size and the transparency of the particle system object group is changed according to a move state or the type of the moving object. Consequently, it is possible to represent the change of the moving speed, the moving direction or the type of the moving object according to not only images of the moving object but also images of the particle system object group. As a result, it is possible to provide a more effective direction.

For example, under the condition a vehicle starts quickly or a missile hits a fighter plane and the fighter plane slows down, the number or the size of the particle system object group is increased than usual. As a result, it is possible to represent the state large quantities of exhaust gases and smokes are emitted temporarily. Further, an $\alpha$ value is changed as the occasion may demand, and the different small transparency from usual is determined. As a result, it is possible to realistically represent as if the exhaust gasses and the smokes were emitted in an abnormal condition such as an imperfect combustion, a fire and so on.

Further, the number or the transparency of the particle system object (smoke) is changed according to the type of the missile. As a result, it is possible to represent a characteristic of the missile so that a straight-flying type of large-sized missile flies so as to rush to a target plane with emitting a large quantities of dark smokes, or a chase-flying type of small-sized missile flies so as to run after a target plane with a small quantities of light smokes.

Preferably, the method as described above, further comprises: changing at least one of providing the particle system object group comprising one particle system object or a predetermined number of particle system objects, a position of the particle system object, a size of the particle system object, and a transparency of the particle system object, on the basis of at least one of a position, a moving speed, a moving direction and a type of the moving object, to provide the particle system object group.

According to the above-described method, because the position, the number or the like of the particle system object included in the particle system object group is changed, it is possible to represent various forms of the particle system object group. Consequently, it is possible to represent the change of the moving speed, the moving direction or the type of the moving object according to not only images of the moving object but also the shape of the particle system object group, and to provide a more effective direction.

For example, in the condition a vehicle starts quickly or a missile hits a fighter plane and the fighter plane slows down and emits smokes, in case of increasing the number or the size of particle system object group, it is possible to more realistically and effectively represent a large quantities of smoke be generated suddenly, by providing particle system object groups circularly and repeatedly than providing particle system object groups linearly.

Further, the number of particle system object groups is brought into be related to a distance from the view point to the moving object. For example, because the number is reduced at a far distance at which a player cannot see well, it is possible to reduce the processing. On the other hand, because the number is increased at a near distance, it is possible to represent the smoke in more detail.

Preferably, the method as described above, further comprises: changing at least one of the predetermined direction and a moving speed of the displacement point, on the basis of at least one of a moving speed, a moving direction, a movement and a type of the moving object, to move the displacement point.

Herein, the movement of the moving object means a change of a posture of the moving object, and a state of a swing of the moving object, caused by the external factors such as a wind, a wave and so on.

According to the above-described method, when the displacement point is moved, the moving speed, the moving direction, the movement or the type of the moving object is considered. Consequently, it is possible to represent the change of the moving speed, the moving direction and the type of the moving object, on the basis of not only the image of the moving object but also the movement and so on of the displacement. As a result, it is possible to provide an effective direction to a player.

For example, in case of the fly of the missile, practically, because a plurality of types of missiles are loaded in the fighter plane, the movement while the missile is flying or how to smoke the missile is not uniform with each other and is one of important factors indicating the characteristic of the missile.

Therefore, the information concerning the type of the missile is referred. In case of the straight-flying type of missile, it is performed to reduce the directional dispersion and the quantity of the substantially vertical directional speed component to the missile flight directional speed component at the displacement point. Accordingly, it is possible to represent powerful images so that the missile straightly dashes forward to the target even if the swing of the posture of the missile is large. In case of the chase-flying type of missile, it is performed to increase the directional dispersion and the quantity of the substantially vertical directional speed component. Accordingly, it is possible to more realistically represent as if the missile is chase-controlled delicately.

Preferably, the method as described above, further comprises: moving the particle system object group on the basis of the displacement point, according to a moving direction of the moving object.

According to the above-described method, the particle system object group is moved in consideration of the change of the moving direction of the moving object. Consequently, it is possible to represent the particle system object group by emphasizing the change of the moving direction of the moving object.

For example, in case the missile suddenly changes the flight direction thereof while flying, the particle system object group is moved in the opposite direction from the flight direction more largely than when the missile flies straightly. Accordingly, it is possible to deform the change of direction of the missile and to represent the missile more dynamically.

Preferably, the method as described above, further comprises: changing at least one of a size and a transparency of the particle system object group as time passes.

Accordingly, the size and the transparency of the particle system object group can be changed regardless of the movement state of a source of generating the particle system object group. Consequently, it is possible to represent in various ways from the generation to the disappearance of the particle system object group. For example, the transparency may be an $\alpha$ value.

For example, in case of a smoke trailing from chimney, the size of the particle system object group is enlarged as time passes. Accordingly, it is possible to represent the diffusion phenomenon of the smoke. Further, in case of a stern wave of a ship, the transparency of the particle system object group is enlarged as time passes. Accordingly, it is possible to realistically represent the state bubbles caused by the stern wave disappear little by little and are out of sight more and more.

Further, in case of not the real particle system object but a star as an expression of magical effects, a magical powder of a fairy and so on, the size or the transparency are increased and reduced as the occasion may demand. Accordingly, it is possible to provide more dynamic and impressive effects.

Preferably, the method as described above, further comprises: changing at least one of a position, a size and a transparency of the particle system object of the particle system object group as time passes.

According to the above-described method, it is possible to change the position, the size and the transparency of the particle system object of the particle system object group, regardless of the movement state of the particle system object at the generation source. Consequently, it is possible to represent the particle system object in more various ways. For example, as described above, the transparency may be an a value.

For example, in case of a smoke rising from a chimney, at the beginning, the smoke is represented as a circular group structure, and after a predetermined time, that is, when the smoke reaches a predetermined altitude, the smoke is represented as a linear group structure. Accordingly, it is possible to represent as if an air current flows at high speed in the sky, and the smoke is swept. Further, in case of the magical powder of the fairy or the star as the expression of the magical effect, the position, the size or the transparency is increased and decreased as the occasion may demand. Accordingly, it is possible to provide more dynamic and impressive effects to a player.

Preferably, the method as described above, further comprises: turning the particle system object which is formed in a board, in a predetermined direction based on the predetermined view point.

According to the above-described method, the particle system object group which is an object (board object) formed in a board which has no thickness is provided in the object space, and a suitable texture is mapped on the board object. Consequently, it is possible to reduce the operation processing. Further, when the board object is provided, it is desired to turn a normal vector of the board object to a view point so that the particle system object is viewed so as not to bent, that is, the board object is performed as a billboard. Consequently, it is possible to realistically represent according to the less operation processing.

In accordance with a second aspect of the present invention, a method for generating image data of a virtual space viewed from a predetermined view point, comprises:
  providing a particle system object group representing a particle system of a cloud or a bubble, so as to attach to or follow a moving object moving in the virtual space, continuously or intermittently;
  changing a position of the particle system object group as time passes; and
  stopping representing the particle system object group or deleting the particle system object group, when the particle system object group is provided for a predetermined time.

According to the method of the second aspect of the present invention, the particle system object group is provided so as to attach to or follow the moving object, and the positions of the particle system object group and the moving object are stored. Then, the position of the particle system object group is changed at predetermined time intervals, according to the change of the posture of the moving object, the flow of the wind, and another influence of a force area. Thereafter, it is performed to stop representing the particle system object group which is provided for the predetermined time and deleting data of the particle system object group. Consequently, it is possible to represent, for example, so that a cloud is diffused or evaporates and disappears.

In accordance with a third aspect of the present invention, a method for generating image data of a virtual space viewed from a predetermined view point, comprises:
  providing a particle system object group representing a particle system of a cloud or a bubble, so as to attach to or follow a moving object moving in the virtual space, continuously or intermittently;
  moving the particle system object group in a predetermined moving direction at a predetermined moving speed, as time passes; and
  changing at least one of the moving direction and the moving speed of the particle system object group according to a movement of the moving object.

According to the method of the third aspect of the present invention, when the particle system object group is moved as time passes, according to the flow of the wind or the rise of the temperature, the particle system object group is moved further according to the change of the moving speed or the moving direction of the moving object. Consequently, it is possible to represent the movement state of the moving object on the basis of not only images of the moving object but also images of the particle system object group. As a result, it is possible to provide a more realistic direction to a player.

In accordance with a fourth aspect of the present invention, an apparatus is adapted to carry out the method of the first, second or third aspect of the present invention.

Preferably, the apparatus of the fourth aspect of the present invention, further comprises a game execution unit for executing a predetermined game according to the image data generated.

In accordance with a fifth aspect of the present invention, a storage medium has a program recorded thereon, when the program is loaded onto an operating apparatus, the program making the operating apparatus execute the method as described above.

According to the storage medium of the fifth aspect of the present invention, the program is loaded from the storage medium having the program recorded thereon to the operating apparatus (for example, a game apparatus, a computer and so on), and makes the operation apparatus execute the above-described method. Consequently, it is possible to provide the same effects as one provided according to the above-described method.

In accordance with a sixth aspect of the present invention, a program, when the program is loaded onto an operating apparatus, makes the operating apparatus execute the method as described above.

In accordance with a seventh aspect of the present invention, a program product comprises a storage medium having a program recorded thereon, when the program is loaded onto an operating apparatus, the program making the operating apparatus execute the method of the first, second or third aspect of the present invention.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 2A is a conceptual view showing polygons provided behind the missile according to an algorithm of generating image data of a smoke of the missile according to an earlier development, and FIG. 2B is a conceptual view showing a mapping state of a characteristic color of the polygons;

FIG. 3A is a conceptual view showing a representation of a trail of the smoke of the missile according to an earlier development, and FIG. 3B is a conceptual view showing a real state of the trail;

FIGS. 6A, 6B and 6C are functional block diagrams of the consumer game machine shown in FIG. 5;

FIG. 7 is a data structure table showing an example of moving object control data;

FIG. 8 is a data structure table showing an example of displacement point control data and a displacement point control data table;

FIG. 9 is a data structure table showing an example of an interpolation coefficient table;

PREFERRED EMBODIMENTS OF THE INVENTION

Hereinafter, a preferred embodiment of the present invention will be explained with reference to figures, as follows.

The present invention will be applied to a fighter plane game (flight simulator) in which a smoke is generated with a trail so as to follow a missile fired from a fighter plane, and explained in the case of the fighter plane game. However, it should be understood that the present invention is not limited to the above-described case.

[Explanation of the Principle of the Embodiment]

Firstly, the principle of the present invention will be explained, as follows.

Figure 4A:
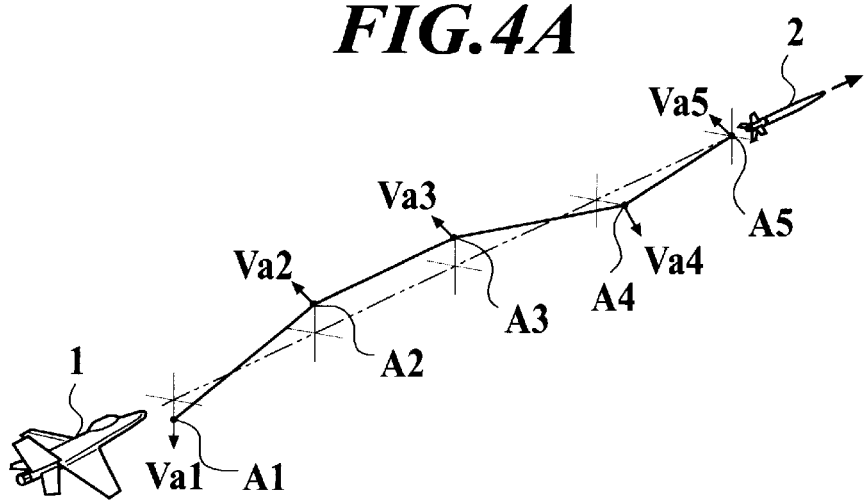
FIGS. 4A, 4B and 4C are conceptual views for explaining a principle of generating image data of a smoke of a missile according to the present invention.
Figure 4B:
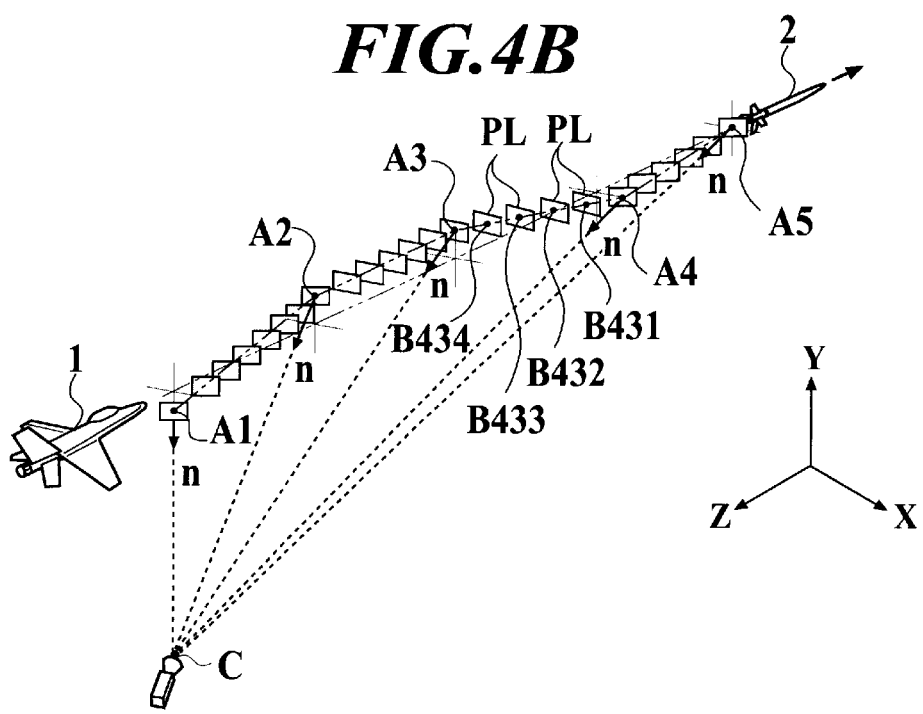
Figure 4C:
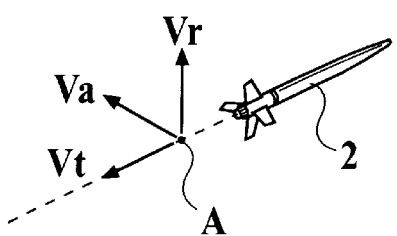

FIGS. 4A to 4C are views showing a state a missile 2 fired from a fighter plane 1 controlled by a player flies to a target. While the missile 2 flies to the target, a posture of the missile 2 always swings upward, downward, rightward and leftward in a flight direction, in order to take the same posture as one of a real missile. Hereinafter, the fighter plane 1 will be called a player plane 1.

First, positional coordinates of the fired missile 2 in an object space are determined for every predetermined time, for example, for every frame that is ⅙ second. Second, moving object control data including positional coordinates, speeds and accelerations determined for every predetermined time are stored with a missile identification number of the missile 2, as missile control data.

As shown in FIG. 4A, displacement points "A" are generated on a trail of the missile 2. The displacement points "A" are generated and determined on the basis of the missile control data determined for every predetermined time. Thereafter, data including displacement point identification numbers, positional coordinates, speeds and accelerations of the displacement points "A", are stored as displacement point control data. In FIG. 4A, after the missile 2 was fired, five frames have passed. Therefore, the displacement points "A1" to "A5" are generated on the basis of the missile control data corresponding to the five frames respectively. The reference numerals "A1" to "A5" of the displacement points follow the order of generated displacement points.

As shown in FIG. 4C, the speed "Va" of the displacement point "A" is determined to be a speed composed of a flight directional component "Vt" of the missile 2 and a substantially vertical directional component "Vr" which is substantially vertical to the flight direction. The direction and the scalar of the substantially vertical directional component "Vr" are determined in accordance with random numbers and so on, at random, and one of factors of representing the swing of the posture of the real missile flying in the sky. Therefore, the displacement points "A1" to "A5" do not keep predetermined positional relationships between each other from the generation to the disappearance, like the smoke of the missile according to an earlier development. The displacement points "A1" to "A5" have speeds directions of which are different from each other and scalars of which are different from each other. Further, because the displacement points "A1" to "A5" move as time passes, the positional relationships between the displacement points "A1" to "A5" changes.

For example, as shown in FIG. 4A, because the positional coordinates of the displacement points "A1" to "A5" are calculated for every predetermined time like the missile 2, the line (solid line) connecting the displacement points "A1" to "A5" is different from the trail (two dotted line) of the missile, which is a position when the smoke is emitted.

As shown in FIG. 4B, interpolation points "B" are determined at suitable intervals between displacement points, for example, between the displacement points "A5" and "A4", the displacement points "A4" and "A3" and so on, in reverse order of reference numerals of the displacement points "A". For example, between the displacement points "A4" and "A3", four interpolation points "B431", "B432", "B433" and "B434" are determined in this order. Then, quadrilateral polygons are generated and provided as particle system objects, at the displacement points "A" and the interpolation points "B" which are representative points of the quadrilateral polygons. Hereinafter, the quadrilateral polygons will be called smoke polygons "PL". Thereafter, when each smoke polygon "PL" is regarded as a billboard and the normal vector "n" of each smoke polygon "PL" is turned to a view point "C", a smoke texture is mapped on each smoke polygon "PL".

As described above, positions on which the smoke polygons "PL" are provided respectively, are determined on the basis of positions of the displacement points "A". Thereby, the smoke of the missile, winding as time passes is generated and provided.

Further, suitably, control data is added to the displacement point control data. Therefore, it is possible to represent the smoke of the missile more realistically. For example, a life variable "L" for reducing the displacement points "A" for every frame and a transparency (for example, an a value) determined so as to increase according to the life variable "L" are added to the displacement point control data. Therefore, it is possible to realistically represent the state the smoke clears, diffuses and disappears little by little as time passes.

Further, a predetermined function changing according to the life variable "L" of the displacement point "A" is provided when the smoke polygons "PL" are generated, and the size of the smoke polygon "PL" generated is changed for every frame. Therefore, it is possible to represent the state the smoke is diffused and swept, and to provide an effect as if a wind flowed there.

[Explanation of the Structure]

Next, the structure according to the embodiment of the present invention will be explained with reference to FIG. 5, as follows.

Figure 5:
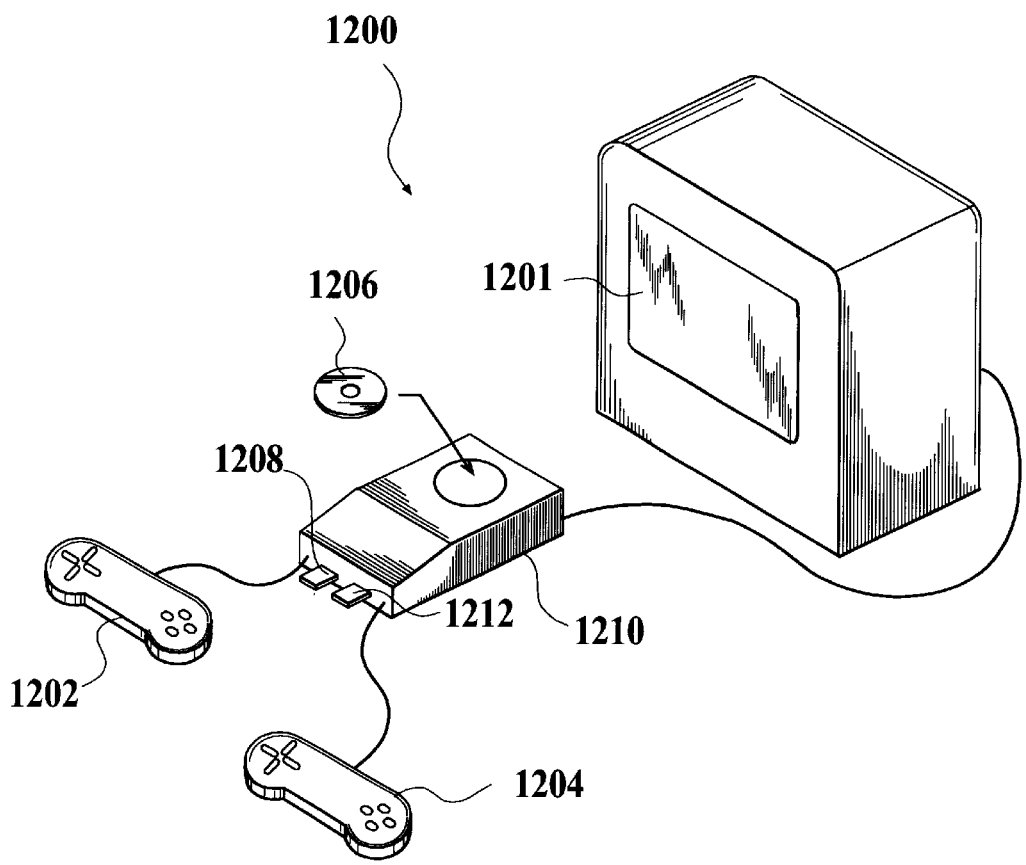
FIG. 5 is an external appearance perspective view showing an exemplary case the present invention is applied to a consumer game machine.

FIG. 5 is a view showing an exemplary case the present invention is applied to a consumer game machine 1200. As shown in FIG. 5, a player controls a game controller 1202 or 1204, and enjoys playing a fighter plane game or the like, with watching game images displayed on a display 1201. In the case, necessary data for playing the game, such as a game program, initial setting data and so on, are stored on a CD-ROM 1206, an IC card 1208, a memory card 1212 or the like, as a data storage medium attachable to and detachable from a game apparatus body 1210.

[Explanation of the Functional Block]

Next, the functional block which can realize the embodiment of the present invention will be explained with reference to FIGS. 6 to 9, as follows.

Figure 6B:
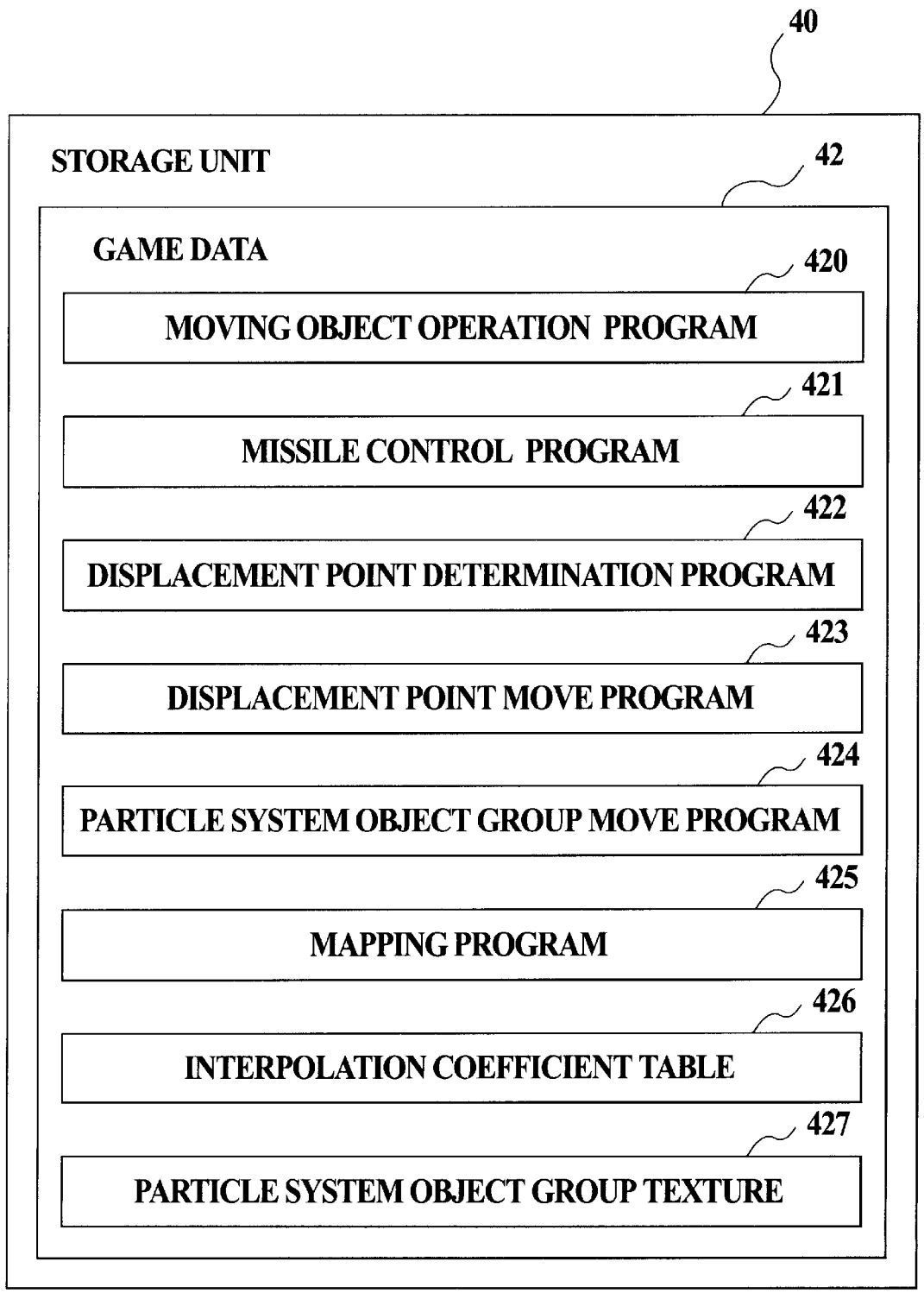
Figure 6C:
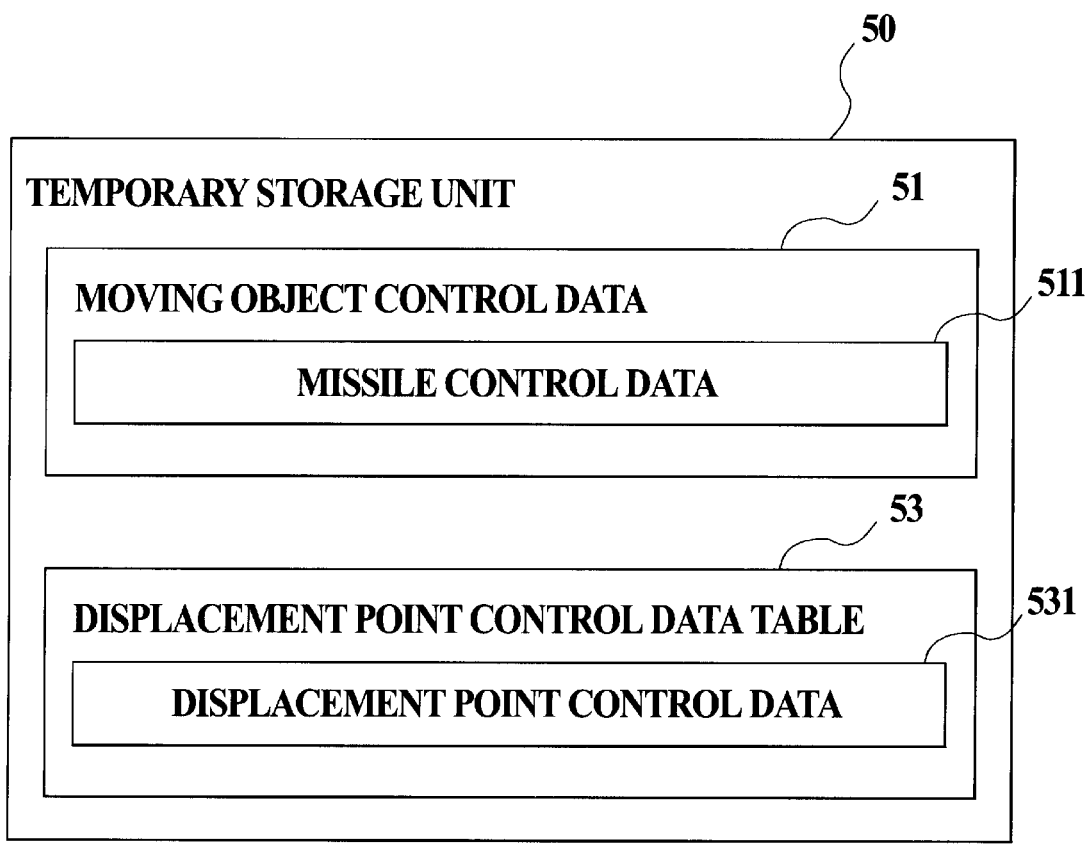

FIG. 6 is a block diagram showing an example of the functional block according to the embodiment of the present invention. As shown in FIG. 6, the functional block comprises an input operating unit 10, a processing unit 20, a display unit 30, a storage unit 40 and a temporary storage unit 50.

The input operating unit 10 outputs game stage data selected by a player, fighter plane data controlled by the player, and so on, to the processing unit 20. The input operating unit 10 has a function which can be realized by hardware such as a lever, buttons and so on.

The processing unit 20 controls the whole game apparatus, instructs each block of the game apparatus, and processes various types of processing such as a game operation and so on. The processing unit 20 has a function which can be realized by hardware such as a CPU (CISC type and RISC type), a DSP, an ASIC (gate array and so on) and so on, or software such as a predetermined program (game program).

Further, the processing unit 20 mainly comprises a game operation unit 22 for operating processes related to the game and an image generation unit 24 for generating image data on the basis of various types of data operated by the game operation unit 22.

The display unit 30 outputs image data generates by the image generation unit 24 to a display screen. The display unit 30 has a function which can be realized by hardware such as a CRT, a LCD, a HMD and so on.

The storage unit 40 is realized by hardware such as a CD-ROM, a game cassette, an IC-card, a MO, a flexible disc, a DVD, a memory, a hard disc and so on. The storage unit 40 stores a game data 42 including a program for operating processing related to various types of games, a necessary setting data to execute the program, and so on, therein.

The game data 42 includes various programs and initial setting data.

As the program, the game data 42 includes a moving object operation program 420, a missile control program 421, a displacement point determination program 422, a displacement point move program 423, a particle system object group move program 424, and a mapping program 425, for performing a moving object operation processing, a missile control processing, a displacement point determination processing, a displacement point move processing, a particle system object group move processing, and a mapping processing, respectively.

As the setting data, the game data 42 includes an internal coefficient table 426 used for the particle system object group move processing, and a particle system object group texture 427 for determining a color and a shape of the smoke.

The temporary storage unit 50 is a storage area for storing data such as the program, data and so on, used by the processing unit 20 and another block, therein. The temporary storage unit 50 has a function which can be realized by hardware such as a RAM and so on. The temporary storage unit 50 stores a moving object control data 51 including data related to positional coordinates, a speed, an acceleration and so on of the moving object in the object space, and a displacement point control data table 53 which is a set of displacement point control data 531 including data related positional coordinates, speeds, accelerations and so on of the displacement points in the object space. The data related to the missile of the moving object control data 51 will be called a missile control data 511.

[Explanation of the Game Operation Unit]

The game operation unit 22 performs various game processing on the basis of the operation data outputted from the input operating unit 10, the game data 42 read out from the storage unit 40 and so on.

The game processing includes, for example, a processing of providing a game selection screen, a processing of modeling an object space, that is, a sky, a water surface, geographical features, buildings and so on, a processing of calculating positions, directions, speeds, accelerations and so on, of a main object such as a fighter plane including the player plane and the target plane and a sub object such as an aircraft carrier, a processing of providing objects in the object space, a processing of selecting mapping data for the objects, a processing of checking hits, a processing of determining results (records), a processing of calculating a position of a view point and an eyes direction, and so on.

Further, the game operation unit 22 comprises a moving object operation unit 220, a missile control unit 221, a displacement point determination unit 222, a displacement point move unit 223 and a particle system object group move unit 224, as a functional block for performing various processing related to the moving object and the particle system object.

The moving object operation unit 220 reads the moving object operation program 420 out from the storage unit 40. Then, the moving object operation unit 220 performs the moving object operation processing of operating a new position, a new speed and so on, on the basis of the moving object control data 51 and the displacement point control data 531. Therefore, the moving object operation unit 220 carries out the moving object operation processing of moving the moving object in the object space, on the basis of the operation data outputted from the input operation unit 10 according to the instruction of the player and the predetermined program.

More specifically, the moving object operation unit 220 calculates new positional coordinates and a new speed on the basis of the control data such as the positional coordinates, the speed, the acceleration of the moving object, at given intervals, for example, for every frame (1/60 second).

In case the position of a moving object of a missile at a "k-1" frame is "Pmk-1", the speed thereof is "Vmk-1", the acceleration thereof is "Amk-1", and the time interval of one frame is "Δt", the position "Pmk" and the speed "Vmk" of the moving object at a "k" frame are calculated in following equations (1) and (2).

$$Pmk = Pmk-1 + Vmk-1 \times \Delta t \quad (1)$$

$$Vmk = Vmk-1 + Amk-1 \times \Delta t \quad (2)$$

In case the present invention is applied to a game besides the fighter plane game (flight simulator), the moving object may be, for example, a ship, a submarine, a surfboard, a car, a motorcycle, a robot, a character and so on.

The missile control unit 221 reads the missile control program 421 out from the storage unit 40. Then, the missile control unit 221 performs the missile control processing of generating and restoring the missile control data 511 indicating the position, the speed and so on in the object space, of each missile fired from the fighter plane.

More specifically, the missile control data 511 is stored in the temporary storage unit 50, and includes a missile identification number, positional coordinates, a speed, an acceleration and an arrival flag as shown in FIG. 7.

When the missile is fired from the fighter plane, the missile control unit 221 determines a new missile identification number, and generates a new missile control data 511. Then, when the missile control unit 221 outputs the positional coordinates, the speed and the acceleration to the moving object operation unit 220 for every frame, the moving object operation unit 220 calculates the new values. Thereafter, the missile control unit 221 restores the new values as the missile control data 511.

For example, as shown in FIG. 7, concerning the missile of the missile identification number "1", the positional coordinates "Pm1", the speed "Vm1", the acceleration "Am1" and the arrival flag "0" are included in the missile control data 511-1.

The displacement point determination unit 222 reads the displacement point determination program 422 out from the storage unit 40. Then, the displacement point determination unit 222 performs the displacement point determination processing of generating a new displacement point on the trail of the missile and determining data such as the position, the speed and so on of the displacement point, on the basis of the missile control data 511. Thereafter, the data such as the position, the speed and so on of the displacement point are stored as the displacement point control data 531, in the temporary storage unit 50.

More specifically, the displacement point control data 531 includes a displacement point identification number "an", positional coordinates, a speed "Van", an acceleration and a life variable "L" as shown in FIG. 8.

The displacement point identification number "an" is "1" when the missile is fired. Further, the displacement point identification number "an" is determined in serial one by one, when the displacement point has already determined.

Coordinates of a periphery of an outlet of a propellant gas of the missile propeller are considered on the basis of the positional coordinates of the fighter plane. The determined coordinates are determined as initial values of the positional coordinates.

The flight directional component "Vtn" of the missile is calculated on the basis of the speed "Vmn" of the missile. Further, the substantially vertical directional component "Vrn" is calculated in accordance with random numbers. Then, the speed "Van" is compounded of the flight directional component "Vtn" and the substantially vertical directional component "Vrn".

The acceleration may be a coefficient for reducing the speed, or a function related to time. The acceleration is determined according to the type of the particle system object to be represented, as the occasion may demand.

The life variable "L" is suitably determined in order to provide the time from the diffusion to the disappearance of the smoke.

For example, as shown in FIG. 8, concerning the displacement point of the displacement point identification number "3" for a missile, the positional coordinates "Pa3", the speed "Va3", the acceleration "Aa1" and the life variable "200" are included in the displacement control data 531-3 of the displacement point control data table 53-1.

Because the displacement points concerning one missile are prepared for every frame, a plurality of displacement points are provided for one missile. Therefore, a plurality of displacement point control data 531 composes the displacement point control data table 53 in the temporary storage unit 50.

Further, if the life variable "L" is determined according to the environment wherein the game is played, it is possible to represent more realistic game images. That is, in the real world, because most component of the condensation trail or the smoke emitted by the missile is like a water, the time from the generation to the disappearance changes according to a temperature, an atmospheric pressure, and a humidity. Therefore, if the life variable "L" can be determined according to the environment such as a tropical zone, a subtropical zone, a frigid zone, and so on, it is possible to more realistically represent the situation the smoke does not clear up for a long time because the humidity is high.

The displacement point move unit 223 reads the displacement point move program 423 out from the storage unit 40.

Then, the displacement point move unit 223 performs the displacement point move processing of regenerating a new displacement point control data 531 of the displacement point which has already generated.

More specifically, the displacement point move unit 223 reads the displacement point control data 531 out from the displacement point control data table 53 one by one, and restores a new displacement point control data 531 in the displacement point control data table 53 one by one.

First, the displacement point move unit 223 subtracts, for example, 1 from the life variable "L". Next, when determining that the life is left, for example, the life variable "L" is not equal to "0", the displacement point move unit 223 outputs the positional coordinates, the speed and the acceleration to the moving object operation unit 220. When the moving object operation unit 220 operates new positional coordinates, a new speed and a new acceleration, the displacement point move unit 223 obtains the new data and restores a new displacement point control data 531 in the displacement point control data table 53. On the other hand, when determining that the life is not left, for example, the life variable "L" is equal to "0", the displacement point move unit 223 deletes the displacement point control data 531 of the displacement point corresponding to the life variable "L" from the displacement point control data table 53.

The particle system object group move unit 224 reads the particle system object group move program 424 from the storage unit 40. Then, the particle system object group move unit 224 performs the particle system object group move processing of calculating interpolation points "B" at predetermined intervals between the displacement points "A", for example, between the displacement points "A5" and "A4", the displacement points "A4" and "A3", and so on, in reverse numerical order of the displacement points "A", and generating the smoke polygons on the basis of the displacement points "A" and the interpolation points More specifically, for example, in case the particle system object group move unit 224 generates the smoke polygons between the displacement points "An" and "An-1", the particle system object group move unit 224 obtains the positional coordinates of the displacement point "An" and the view point "C", and calculates the distance from the view point "C" to the displacement point "An". Then, the particle system object group move unit 224 refers the interpolation coefficient table 426 providing the relationship between the distance from the view point "C" to the displacement point "An" and the condition of generating the smoke polygon.

Herein, the interpolation coefficient table 426 is stored as one of the game data 42 in the storage unit 40. As shown in FIG. 9, the interpolation coefficient table 426 includes the number of interpolation sheets for determining how many polygon sheets are generated between the displacement points, the interpolation function for determining the positional coordinates at which the polygons are generated between the displacement points and so on, according to the distance from the view point to the displacement point "An".

The number of interpolation sheets is provided to be smaller in case the distance from the view point is far, and to be larger in case the distance from the view point is near. For example, as shown in FIG. 9, in case the distance "Section 1" is nearer to the view point than the distance "Section 2", the number of interpolation sheets of the distance "Section 1" is "100" and larger than the number of interpolation sheets of the distance "Section 2" which is "95". Therefore, concerning the distance "Section 1", the number of interpolation sheets "100" and the interpolation function "f1(x, y, z)" are included in the interpolation coefficient table 426.

Accordingly, because the number of smoke polygons is reduced far from the view point, it is possible to lighten the processing. On the other hand, because the density of smoke polygons is high near to the view point, it is possible to represent more realistic game images.

The interpolation function may be a linear function of interpolating between the displacement points at predetermined intervals. However, the interpolation function is not limited to the linear function. In case the interpolation function is a curvilinear function which is not represented by a linear operation equation, for example, a spline curve, a Bezier curve or the like, because the smoke polygons are generated and provided in a smooth curve along the displacement points, it is possible to represent more realistic game images.

When the particle system object group move unit 224 refers the number of interpolation sheets and the interpolation function of the interpolation coefficient table 426, the particle system object group move unit 224 determines the interpolation points "Bn" between the displacement points "An" and "An-1". Then, the particle system object group move unit 224 provides the smoke polygons so that the representative points of the smoke polygons are the displacement points "An" and "An-1" and the interpolation points "Bn" respectively. When providing the smoke polygons, the particle system object group move unit 224 performs the smoke polygons as a billboard so that the normal vector of each smoke polygon is turned to the view point. Therefore, even if the smoke polygons are boards, it is possible to represent the smoke polygons so as not to look unnaturally light and bent.

The image generation unit 24 performs the processing of generating image data according to various data of the operation signal outputted from the input operating unit 10, various coordinates and so on. The image generation unit 24 has a function which can be realized by hardware such as a CPU, a DSP, an image generation IC, a memory and so on. Then, when the image generation unit 24 outputs the generated image data to the display unit 30, the generated image data are displayed on the display unit 30. Further, the image generation unit 24 comprises a mapping unit 240 for performing a processing of mapping the smoke texture on the smoke polygons on the basis of data outputted from the game operation unit 22.

The mapping unit 240 reads the mapping program 425 out from the storage unit 40, when coordinate data of vertexes of the smoke polygon are inputted from the game operation unit 22. Then, the mapping unit 240 performs a mapping processing of mapping the smoke texture provided in a particle system object group texture 427, on the smoke polygons. More specifically, because the particle system object group texture 427 provides a plurality of textures having different sizes and shading patterns from each other, the mapping unit 240 selects a texture from the plurality of textures on the basis of the mapping program 425, as the occasion may demand, and maps the selected texture on the smoke polygon.

[Explanation of the Flows]

Next, the exemplary processing according to the embodiment of the present invention will be explained in detail, with reference to FIGS. 10 to 14.

Figure 10:
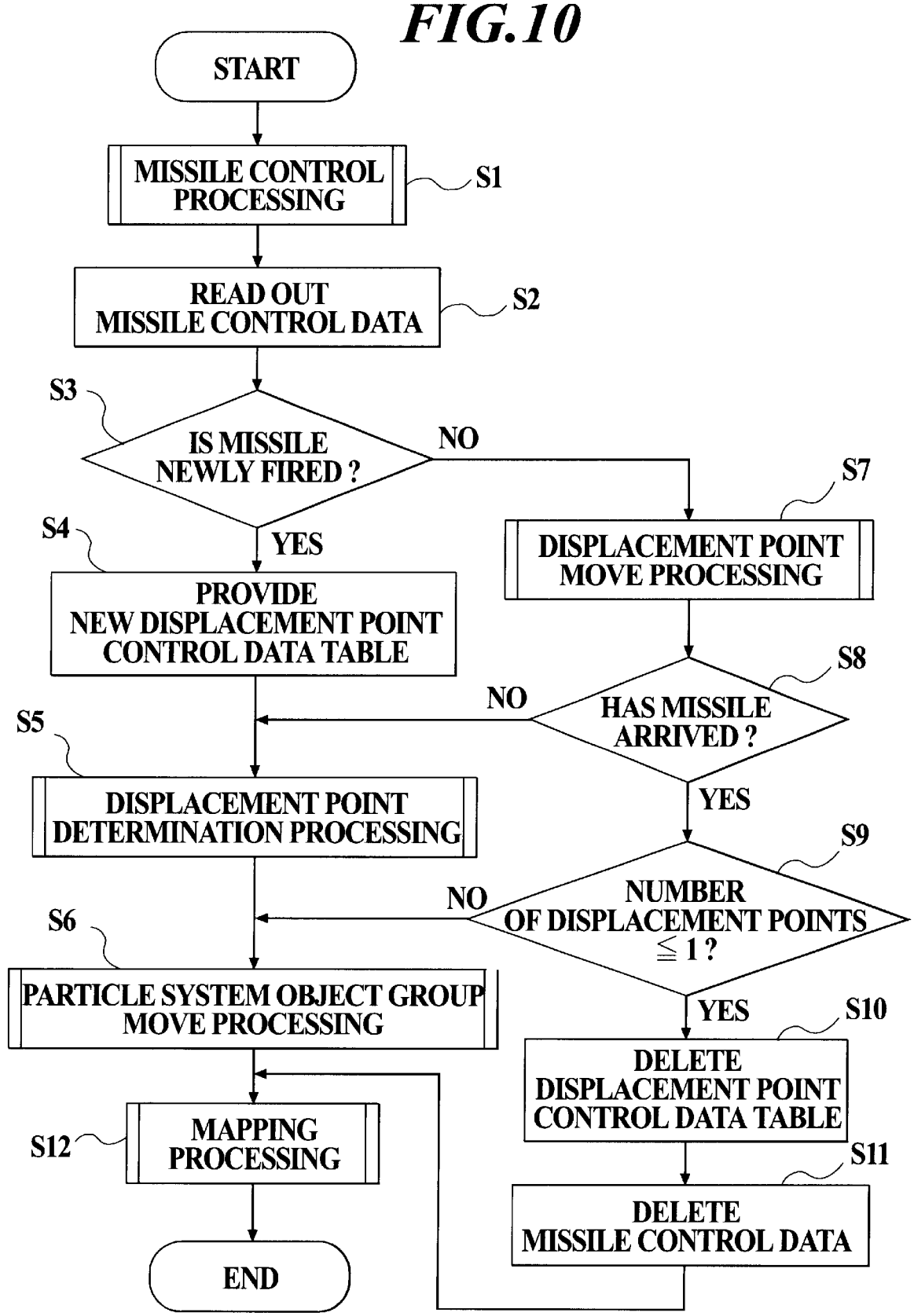
FIG. 10 is a basic flow chart showing an example of a processing of generating image data of the smoke of the missile according to the present invention.

FIG. 10 is an exemplary basic flow chart for explaining a processing of generating smoke image data according to the present invention. According to the flow shown in FIG. 10, the game operation unit 22 performs the processing to the missiles one by one, for every frame.

Hereinafter, each process will be explained in order of firing, flying, arriving and disappearing of the missile, with reference to FIGS. 10 to 14.

[Processing When the Missile is Fired]

First, the processing when the missile is fired will be explained.

As shown in FIG. 10, first, the missile control unit 221 performs the missile control processing, to determine the missile control data 511 such as positions in the object space, a speed and so on of a missile (Step S1).

Figure 11:
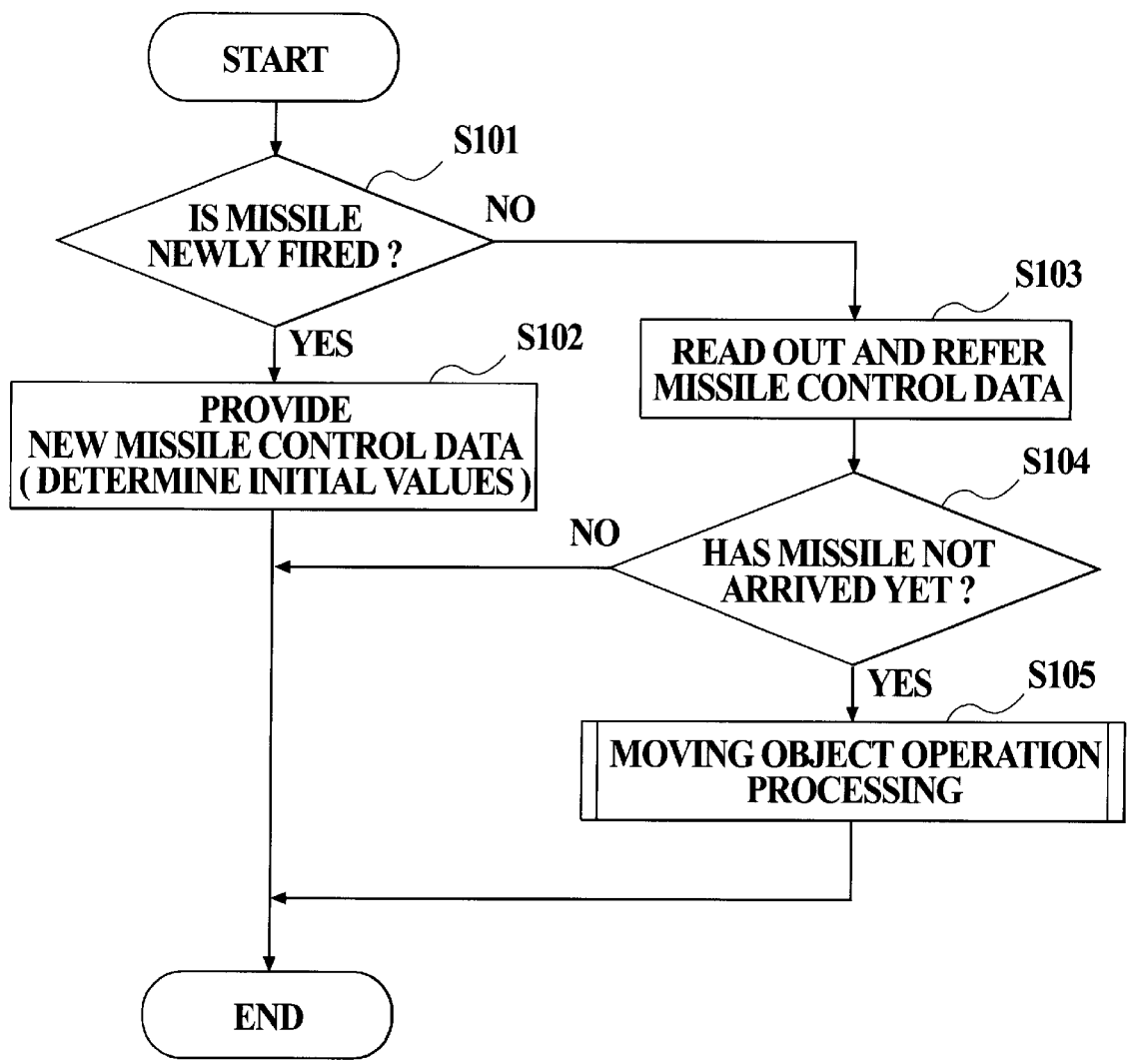
FIG. 11 is a flow chart showing an example of a missile control processing.

According to the missile control processing, as shown in FIG. 11, the missile control unit 221 determines whether the missile is newly fired or not (Step S101). Because the missile is newly fired, when the missile control unit 221 determines that the missile is newly fired (Step S101; YES), the missile control unit 221 provides a new missile control data 511 in the temporary storage unit 50, and determines initial values of the missile control data 511 (Step S102).

When finishing the missile control processing, as shown in FIG. 10, the game operation unit 22 starts the processing related to the displacement point and the smoke polygon. The game operation unit 22 reads the missile control data 511 out from the temporary storage unit 50 (Step S2). Because the missile is newly fired, when the game operation unit 22 determines that the missile is newly fired (Step S3; YES), the game operation unit 22 provides a new displacement point control data table 53 in the temporary storage unit 50 (Step S4). Because the displacement point control data table 53 is provided for each missile, a table identification number may be the same one as the missile identification number.

Next, the displacement point determination unit 222 performs the displacement point determination processing, to determine a new displacement point. Then, the displacement point determination unit 222 stores a new displacement point control data 531 of the determined displacement point, in the displacement point control data table 53 provided in the Step S4 (Step S5).

Figure 12:
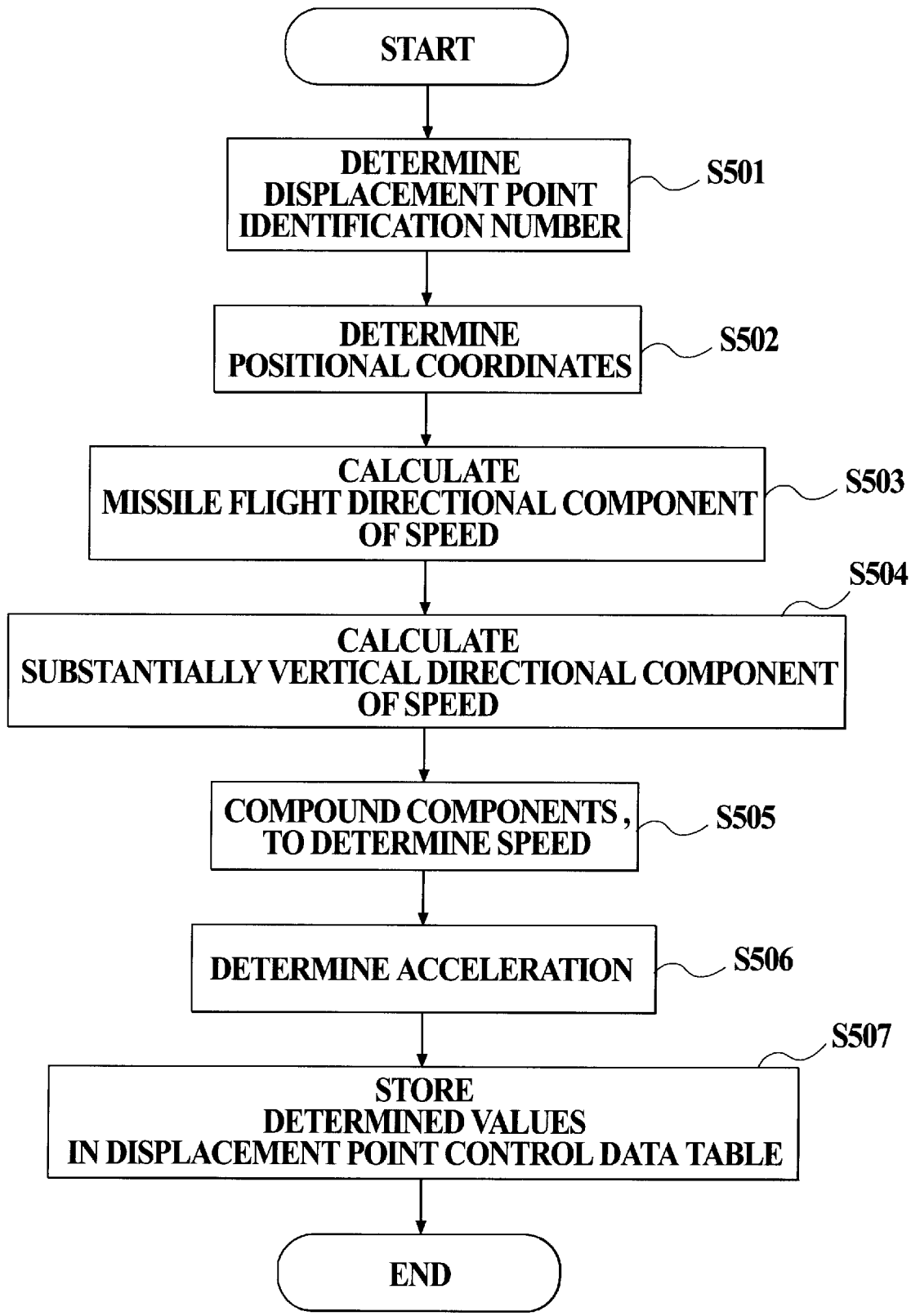
FIG. 12 is a flow chart showing an example of a displacement point determination processing.

According to the displacement point determination processing, as shown in FIG. 12, the displacement point determination unit 222 determines the displacement point identification number "an" to be "1", because the missile has been just fired (Step S501). Then, the displacement point determination unit 222 calculates the positional coordinates of the outlet of the missile propellant gas on the basis of the positional coordinates of the missile included in the missile control data 511, and determines the positional coordinates of the displacement point on the basis of the positional coordinates of the outlet of the missile propellant gas (Step S502). Then, the displacement point determination unit 222 calculates the missile flight directional component of the speed of the displacement point, on the basis of the speed of the missile (Step S503). Further, the displacement point determination unit 222 generates a random number, and calculates the substantially vertical directional component of the speed of the displacement point according to the generated random number (Step S504). Thereafter, the displacement point determination unit 222 compounds the missile flight directional component and the substantially vertical directional component, to determine the speed of the displacement point (Step S505). Further, the displacement point determination unit 222 determines the acceleration of reducing the speed of the smoke, as the occasion may demand (Step S506). Then, the displacement point determination unit 222 stores the determined values in the displacement point control data table 53 (Step S507), and finishes the displacement point determination processing.

Figure 14:
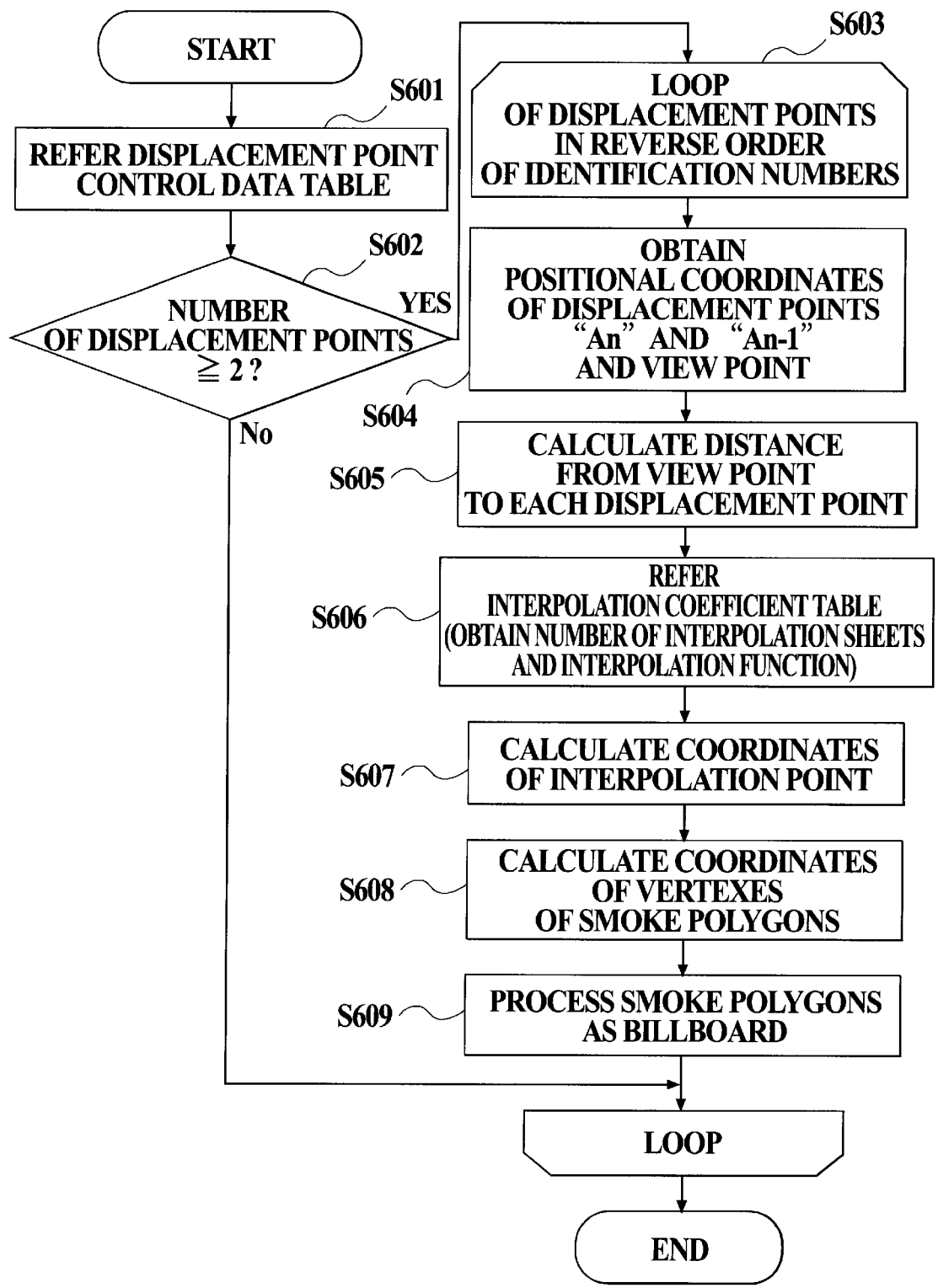
FIG. 14 is a flow chart showing an example of a particle system object group move processing.

When finishing the displacement point determination processing, as shown in FIG. 10, the particle system object group move unit 224 starts the particle system object group move processing as shown in FIG. 14 (Step S6).

According to the particle system object group move processing, as shown in FIG. 14, the particle system object group move unit 224 refers the displacement point control data table 53 in which the determined values are stored in Step S507 of the FIG. 12 (Step S601). Then, the particle system object group move unit 224 determines whether the number of displacement points is equal to or more than "2", or not, on the basis of the displacement point control data table 53 (Step S602; NO). Because the missile has been just fired, only one displacement point is determined. Therefore, because the particle system object group move unit 224 determines that the number of displacement points is not equal to or more than "2" (Step S602), and finishes the particle system object group move processing, the smoke polygon is not generated.

When finishing the particle system object group move processing, as shown in FIG. 10, the mapping unit 240 starts the mapping processing (Step S12). However, because there is not the smoke polygon as an object of mapping, the game operation unit 22 finishes the basic flow shown in FIG. 10.

[Processing While the Missile is Flying]

Next, the processing while the missile is flying will be explained.

As shown in FIG. 10, first, the missile control unit 221 performs the missile control processing, to determine a new missile control data 511 including positions in the object space, the speed and so on of the missile (Step S1).

According to the missile control processing, as shown in FIG. 11, because the missile is not newly fired, the missile control unit 221 determines that the missile is not newly fired (Step S101; NO). Then, because the missile control data 511 has been already stored in the temporary storage unit 50, the missile control unit 221 reads the stored missile control data 511 out from the temporary storage unit 50 and refers the read missile control data 511 (Step S103). Then, the missile control unit 221 determines whether the missile has not arrived at a target yet or not (Step S104).

Because the missile is flying, the missile control unit 221 determines that the missile has not arrived at a target yet (Step S104; YES). Then, the missile control unit 221 performs the moving object operation program (Step S105), to determine new positional coordinates and a new speed. Thereafter, when the missile control unit 221 restores a new missile control data 511 in the temporary storage unit 50, the missile control unit 221 finishes the missile control processing.

When finishing the missile control processing, as shown in FIG. 10, because the missile is not newly fired, the displacement point move unit 223 performs the displacement point move processing (Steps S2, S3 and S7).

Figure 13:
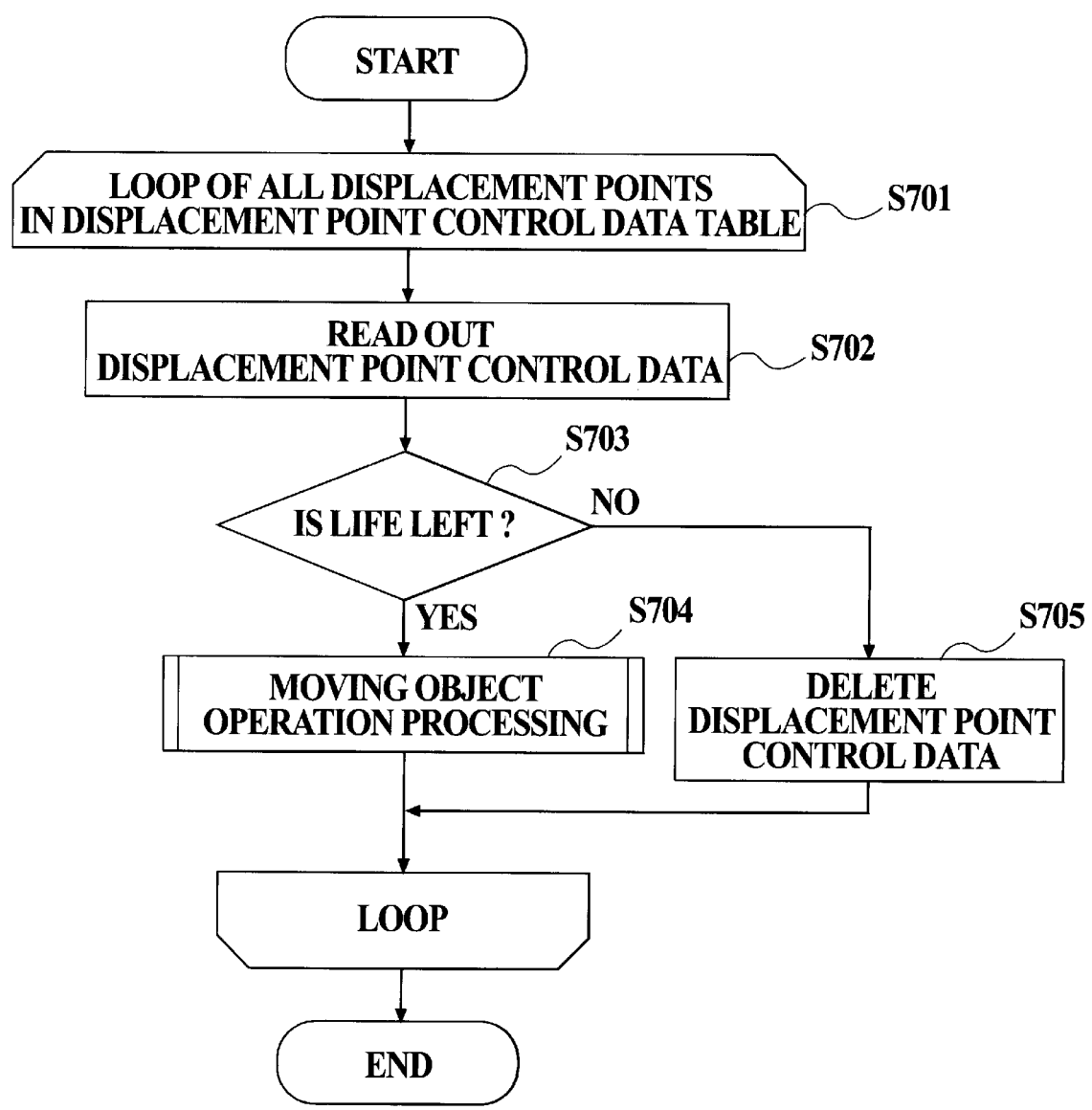
FIG. 13 is a flow chart showing an example of a displacement point move processing.

According to the displacement point move processing, as shown in FIG. 13, the displacement point move unit 223 performs the processing of referring the displacement point control data table 53 which has been already stored in the temporary storage unit 50 (Step S702), and restoring new control data of displacement points in reverse order of the displacement point identification numbers (Steps S703 to S705), to all displacement points stored in the displacement point control data table 53 (Step S701).

When the displacement point move unit 223 reads the displacement point control data 531 of one displacement point from the temporary storage unit 50 (Step S702), the displacement point move unit 223 reduces the life variable "L" of the displacement point, and determines whether the life is left or not, on the basis of the life variable "L" (Step S703).

When the displacement point move unit 223 determines that the life is left, that is, the life variable "L" is not equal to "0" (Step S703; YES), the displacement point move unit 223 performs the moving object operation processing (Step S704), to determine new positional coordinates and a new speed of the displacement point. Then, when the displacement point move unit 223 restores a new displacement point control data 531 including the positional coordinates and the speed in the temporary storage unit 50, the displacement point move unit 223 finishes the displacement point move processing.

On the other hand, when the displacement point move unit 223 determines that the life is not left, that is, the life variable "L" is equal to "0" (Step S703; NO), because it means that the smoke is diffused and disappears as time passes, the displacement point move unit 223 deletes the displacement point control data 531 from the corresponding displacement point control data table 53 (Step S705), and finishes the displacement point move processing.

When finishing the displacement point move processing, as shown in FIG. 10, the game operation unit 22 determines whether the missile has arrived at the target or not (Step S8). Because the missile is flying, the game operation unit 22 determines that the missile has not arrive yet (Step S8; NO). Then, the displacement point determination unit 222 starts the displacement point determination processing, to determine a new displacement point in order not to break the smoke within the flying distance of the missile, and to store a new displacement point control data 531 including control data of the new displacement point in the displacement point control data table 53 (step S5). Then, the particle system object group move unit 224 performs the particle system object group move processing on the basis of the displacement point control data table 53 (Step S6).

According to the particle system object group move processing, as shown in FIG. 14, the particle system object group move unit 224 reads the displacement point control data table 53 out from the temporary storage unit 50 (Step S601). Then, the particle system object group move unit 224 determines whether the number of displacement points is equal to or more than "2" or not, on the basis of the displacement point control data table 53 (Step S602). Because there are at least two displacement points, when the particle system object group move unit 224 determines that the number of displacement points is equal to or more than "2" (Step S602; YES), the particle system object group move unit 224 provides smoke polygons at the displacement points in reverse order of the displacement point identification numbers (Step S603).

First, the particle system object group move unit 224 obtains positional coordinates of the displacement points "An" and "An-1" and the view point "C" (Step S604), and then calculates the distance from the view point "C" to each of the displacement points "An" and "An-1" (Step S605). Thereafter, the particle system object group move unit 224 refers the interpolation coefficient table 426 providing the relationship between the distance from the view point "C" to each displacement point "An" and the condition of generating the smoke polygon, and obtains the number of interpolation sheets and the interpolation function (Step S606).

When referring the number of interpolation sheets and the interpolation function of the interpolation coefficient table 426, the particle system object group move unit 224 calculates coordinates of the interpolation point "Bn" between the displacement points "An" and "An-1" (Step S607). Then, the particle system object group move unit 224 calculates coordinates of vertexes of smoke polygons so that the coordinates of the displacement point "An" and "An-1" and the interpolation point "Bn" are representative coordinates of the smoke polygons (Step S608). Further, the particle system object group move unit 224 processes the smoke polygons as a billboard so that a normal vector "n" of each smoke polygon is turned to the view point (Step S609). Therefore, even if the smoke polygon has a board shape, because the smoke polygon is always turned to the view point, the smoke polygon dose not look like unnaturally light or bent.

As described above, when performing the particle system object group move processing to all displacement points "A" in the displacement point control data table 53, the particle system object group move unit 224 finishes the particle system object group move processing.

When finishing the particle system object group move processing, as shown in FIG. 10, the game operation unit 22 outputs the coordinates of the vertexes of the smoke polygons to the mapping unit 240. Then, the mapping unit 240 maps a particle system object group texture 427 on the smoke polygons (Step S12).

Figure 22:
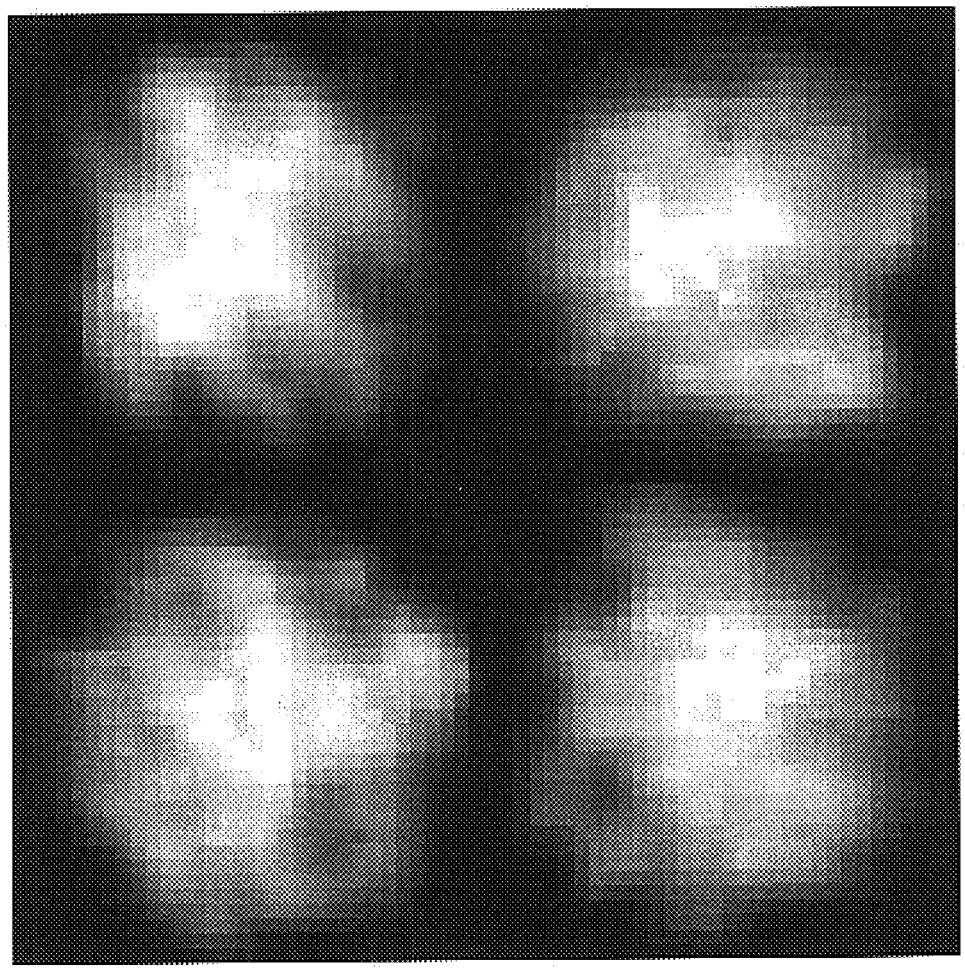
FIG. 22 is a view showing an example of smoke textures according to an embodiment of the present invention.

The particle system object group texture 427 comprises a plurality of different smoke images from each other, as shown in FIG. 22.

Therefore, the mapping unit 240 selects one of the plurality of smoke images, at random, for every smoke polygon, rotates the selected smoke image, as the occasion may demand, and maps the rotated smoke image on the smoke polygon. Accordingly, even if the smoke polygons continue, the smoke polygons do not look unnatural caused by continuous same textures.

When the mapping unit 240 finishes the mapping processing, the game operation 22 finishes the processing of generating the smoke image in the frame.

[Processing When the Missile Arrives]

Next, the processing just after the missile arrives at the target will be explained.

As shown in FIG. 10, the missile control unit 221 starts the missile control processing. However, because the missile has already disappeared, the missile control unit 221 performs nothing and finishes the missile control processing (Step S1).

When the missile control unit 221 finishes the missile control processing, as shown in FIG. 10, because the missile is not newly fired, the displacement point move unit 223 performs the displacement point move processing (Steps S2, S3 and S7).

According to the displacement point move processing, like the above-described processing while the missile is flying, the displacement point move unit 223 restores new displacement point control data 531 in reverse order of displacement point identification numbers in the displacement point control data table 53 (Steps S701 to S705; FIG. 13).

When the displacement point move unit 223 finishes the displacement point move processing, as shown in FIG. 10, the game operation unit 22 determines whether the missile has arrived or not (Step S8). Because the missile has already arrived and disappeared, the game operation unit determines that the missile has arrived and a smoke is not generated (Step S8; YES). Therefore, because the displacement point determination unit 222 does not perform the displacement point determination processing, the game operation unit determines the number of displacement points (Step S9). Because the missile has just arrived, the game operation unit 22 determines that the life variables "L" of some displacement points are not equal "0" and the smokes which are not diffused and do not disappear are left. Therefore, the particle system object group move unit 224 performs the particle system object group move processing (Step S6), and generates smoke polygons. Thereafter, the mapping unit 240 performs the mapping processing (Step S12), and the game operation unit 22 finishes the basic flow.

[Processing After the Missile has Disappeared]

Next, the processing of the smoke left after the missile has arrived, been broken and disappeared will be explained.

As shown in FIG. 10, the missile control unit 221 starts the missile control processing. However, because the missile has already disappeared, the missile control unit 221 performs nothing and finishes the missile control processing (Step S1). Then, because the missile is not newly fired, the displacement point move unit 223 performs the displacement point move processing to restore a new displacement point control data 531 in the displacement point control data table 53 (Steps S2, S3 and S7).

Then, because the missile has arrived, the game operation unit 22 determines the number of displacement points (Step S8). In case the sufficient time has passed since the missile arrived and disappeared, because the life variables "L" of the displacement points become "0", the number of displacement points left in the displacement point control data table 53 decreases. Therefore, in case the number of displacement points is equal to or less than "1", the game operation unit 22 determines that it is unnecessary to generate smoke polygons between the displacement points. As a result, the game operation unit 22 deletes the displacement point control data table 53 and the missile control data 511 from the temporary storage unit 50 (Steps S9 to S12).

According to the above-described processing, all the smoke which is left after the missile has arrived and disappeared, disappears. Consequently, it is possible to generate the smoke polygons from the fire to the disappearance of the missile.

Figure 1:
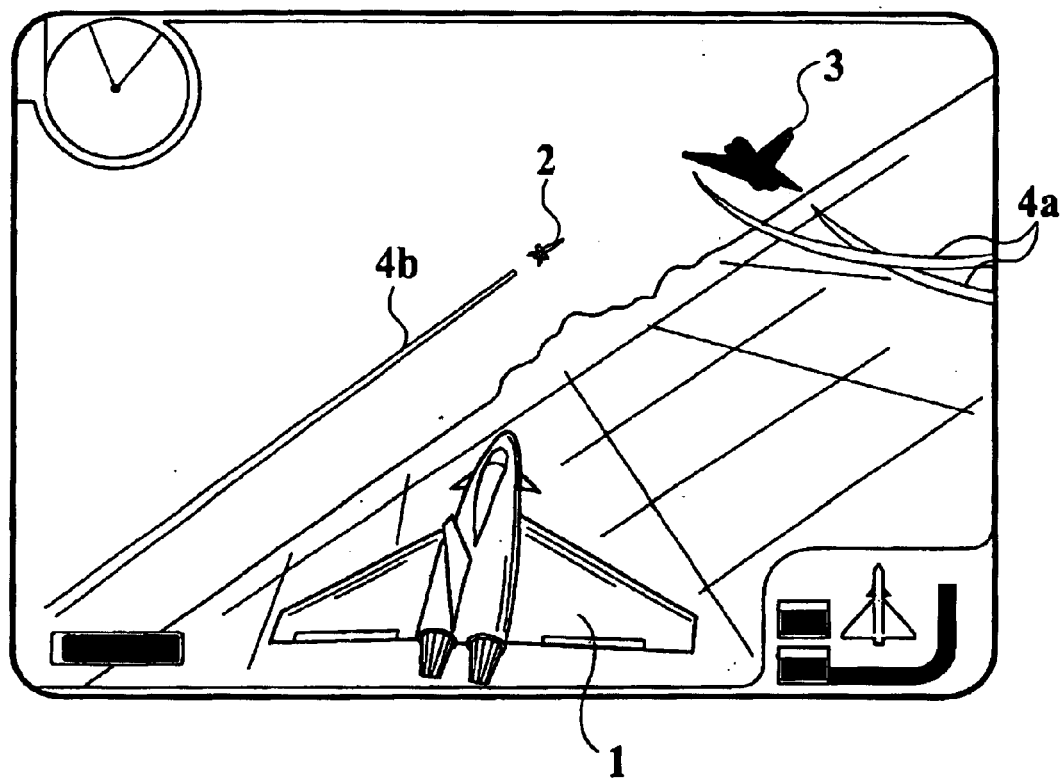
FIG. 1 is an exemplary game screen representing a state a missile flies to a target plane in a fighter plane game.
Figure 23A:
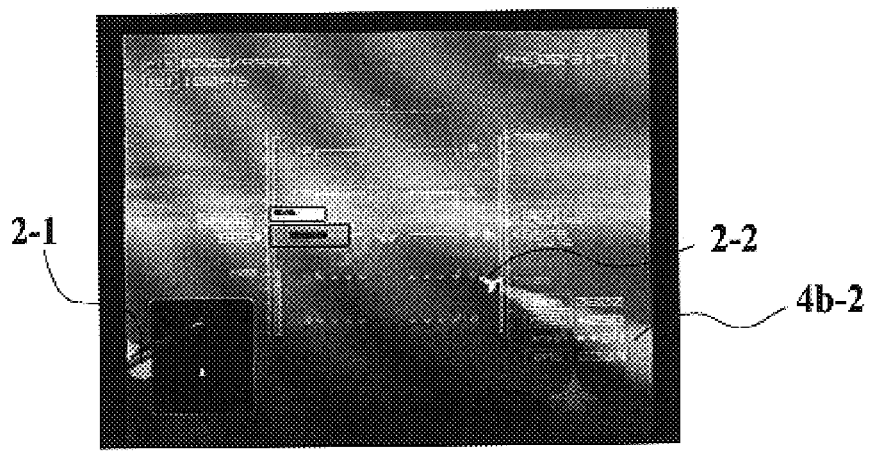
FIGS. 23A, 23B and 23C are exemplary game screens according to an embodiment of the present invention.
Figure 23B:
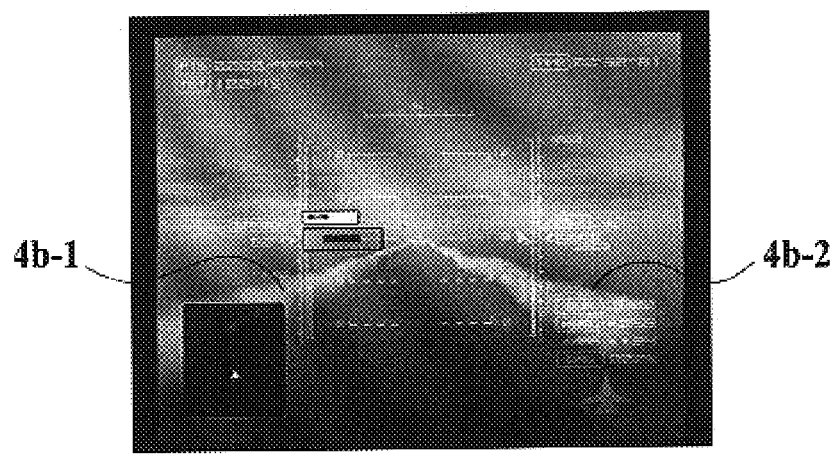
Figure 23C:
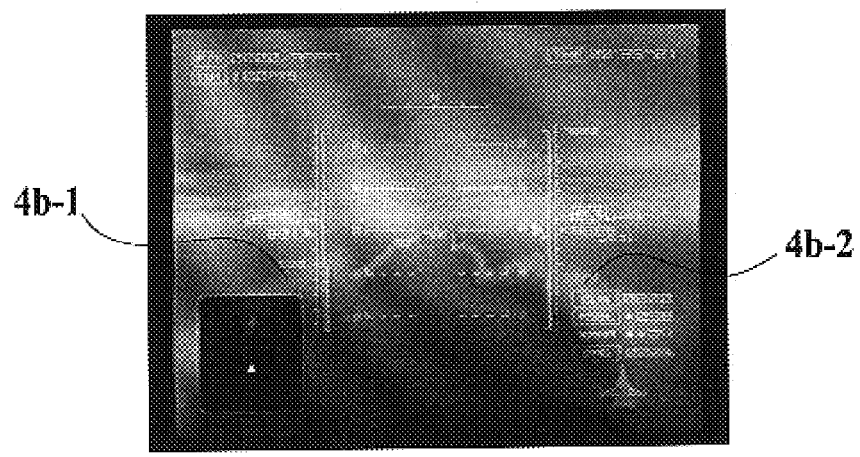

FIGS. 23A, 23B and 23C are views showing exemplary game screens generated according to the above-described processing. The game screens are viewed from a cockpit of the player plane 1 (shown in FIG. 1) so that the cockpit is the view point "C" (shown in FIG. 4B).

In FIG. 23A, two missiles 2-1 and 2-2 enter from the left side and the right side to the screen, respectively. Further, the smoke 4b-2 is represented so as to follow the missile 2-2 on the screen.

In FIG. 23B, when the more time has passed, two missiles 2-1 and 2-2 fly to the center of the screen (in the far direction of the object space). Further, the state is realistically represented on the screen so that the smokes 4b-1 and 4b-2 are left in a zigzag line behind the missiles 2-1 and 2-2 as time passes.

In FIG. 23C, the state is realistically represented so that the smokes 4b-1 and 4b-2 are left in a more zigzag line on the peripheral of the screen as more time passes.

As described above, it is possible to realistically represent the state the particle system object group moves as time passes.

[Structure of Hardware]

Next, an exemplary hardware structure realizable of the embodiment of the present invention will be explained with reference to FIG. 15, as follows.

Figure 15:
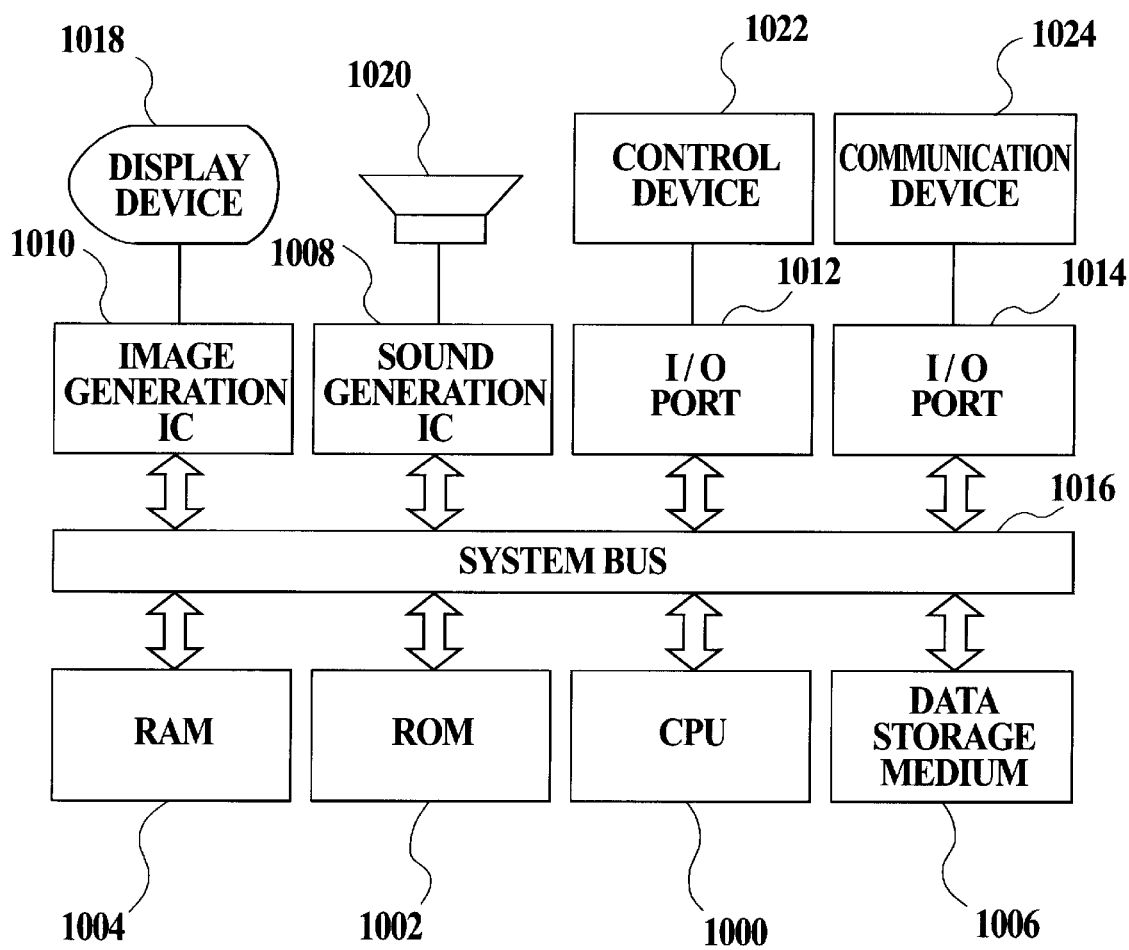
FIG. 15 is a block diagram showing an exemplary structure of hardware realizable of the present embodiment of the present invention.

An apparatus as shown in FIG. 15 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween. A display device 1018 is further connected to the image generation IC 1010, a speaker 1020 is further connected to the sound generation IC 1008, a control device 1022 is further connected to the I/O port 1012, and a communication device 1024 is further connected to the I/O port 1014.

The data storage medium 1006 corresponds to the storage unit 40 shown in FIG. 6. Further, the data storage medium 1006 stores primarily programs, image data for representing objects, sound data, play data and so on, and further the game data 42 shown in FIG. 6, therein.

In case the present invention is realized in a consumer game machine, a CD-ROM, a game cassette, a DVD or other medium is used as the data storage medium for storing game programs and other data, and a memory card or other medium is used as the data storage medium for storing play data. In case the present invention is realized in an arcade game machine, a CD-ROM, a hard disc or other medium is used as the data storage medium. In the case, the data storage medium 1006 is realized by the ROM 1002.

The control device 1022 corresponds to the input operating unit 10 shown in FIG. 6. Further, the control device 1022 is equivalent to a game controller, an input operating panel or the like. Therefore, the control device 1022 is used by a player when the player inputs the decision results while playing the game to the apparatus body.

The CPU 1000 corresponds to the processing unit 20 shown in FIG. 6. Further, the CPU 1000 controls the overall of the apparatus and processes various data, according to the programs stored in the data storage medium 1006, the system program including initialization data for the apparatus and so on, stored in the ROM 1002, signals outputted from the control device 1022, or the like.

The RAM 1004 is a storage means used as an operating memory by the CPU 1000, or the like. Further, the RAM 1004 stores the particular contents of the data storage medium 1006 or the ROM 1002, operating results of the CPU 1000, or the like, therein. The RAM 1004 corresponds to the temporary storage unit 50 shown in FIG. 6.

The sound generation IC 1008 and the image generation IC 1010 are also disposed in such a type of game apparatus, to generate and output sounds and images appropriate to the game.

The sound generation IC 1008 is an integrated circuit for generating game sounds such as sound effects, background music and so on, on the basis of data stored in the data storage medium 1006 or the ROM 1002. The game sounds generated by the sound generation IC 1008 are outputted from the speaker 1020.

The image generation IC 1010 is an integrated circuit for generating pixel data to be outputted to the display device 1018, on the basis of image data outputted from the RAM 1004, the ROM 1002, the data storage medium 1006 or the like.

The display device 1018 corresponds to the display unit 30 shown in FIG. 6. Further, the display device 1018 can be realized by a CRT, a LCD, a TV, a plasma display, a liquid crystal plasma display, a projector or the like.

The communication device 1024 is a device for communicating various data used by the game apparatus with an external device. If the game apparatus is connected with another game apparatus, the communication device 1024 is used for communicating game programs, predetermined data corresponding to game programs, or other data with another game apparatus, through the communications line.

Various processing explained with reference to FIGS. 4 to 9, are realized by the data storage medium 1006 which stores programs for executing processing shown in the flow charts of the FIGS. 10 to 14, and the CPU 100, the image generation IC 1010, the sound generation IC 1008 and so on which operate according to the programs. Further, the processing performed by the image generation IC 1010, the sound generation IC 1018 or the like may be performed by the CPU 1000, a general DSP or the like, as software.

The present invention can be applied not only to the consumer game machine show in FIG. 4, but also to various apparatuses such as an arcade game machine, a large-sized attraction machine in which a large number of players participate, a simulator, a multimedia terminal, an image generation apparatus, a system board for generating game images and so on.

Figure 16:
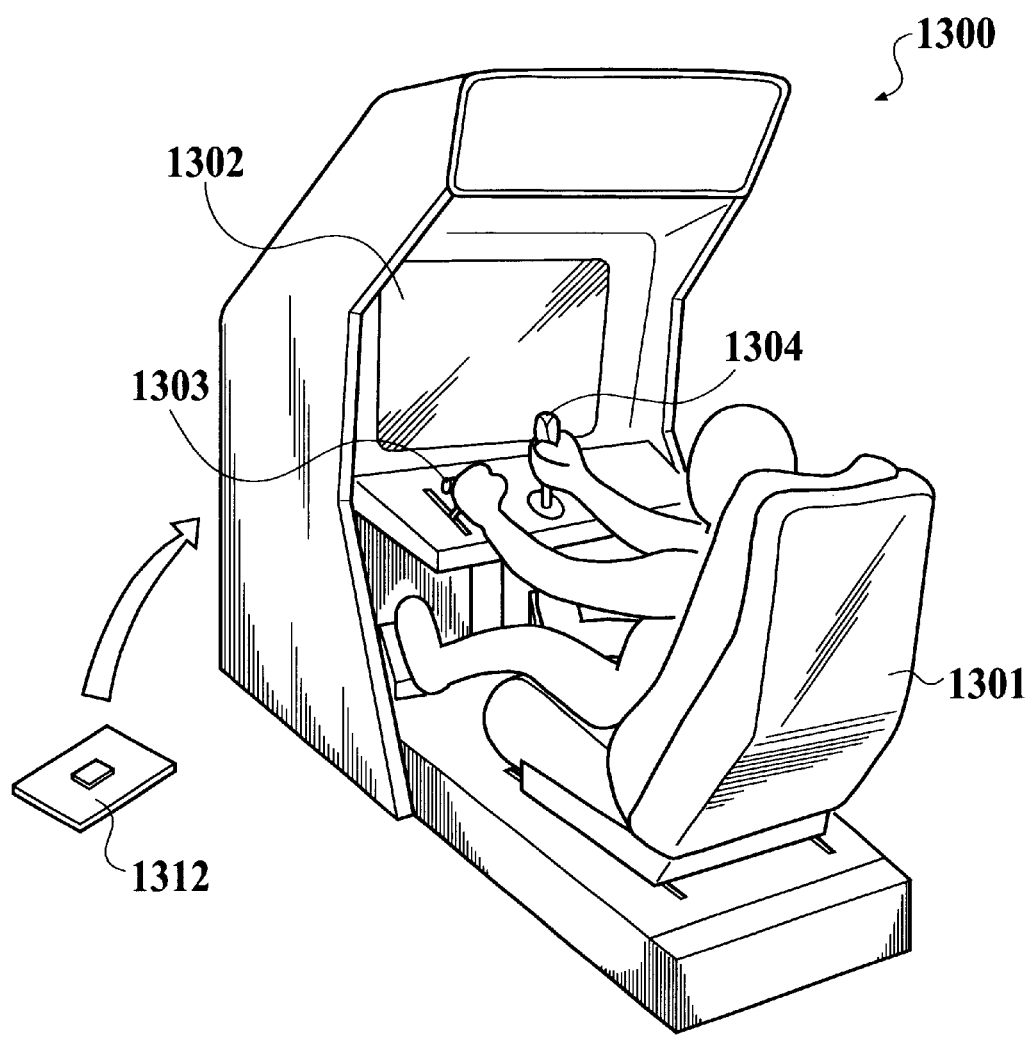
FIG. 16 is a view showing an exemplary case the present invention is applied to an arcade game machine.

For example, FIG. 16 is a view showing an exemplary case the present invention is applied to an arcade game machine 1300.

As shown in FIG. 16, the arcade game machine 1300 is modeled on a shape of a cockpit of a fighter plane. Therefore, in the arcade game machine 1300, a player sitting in a seat 1301 enjoys piloting a virtual fighter plane by controlling a control stick 1303, a slot lever 1304 and so on, with watching images displayed on a display 1302.

Further, the CPU, the image generation IC, the sound generation IC and so on are mounted on a system board 1312 incorporated in the arcade game machine 1300. The game data 42 is stored in a memory as a data storage medium mounted on the system board 1312.

Figure 17:
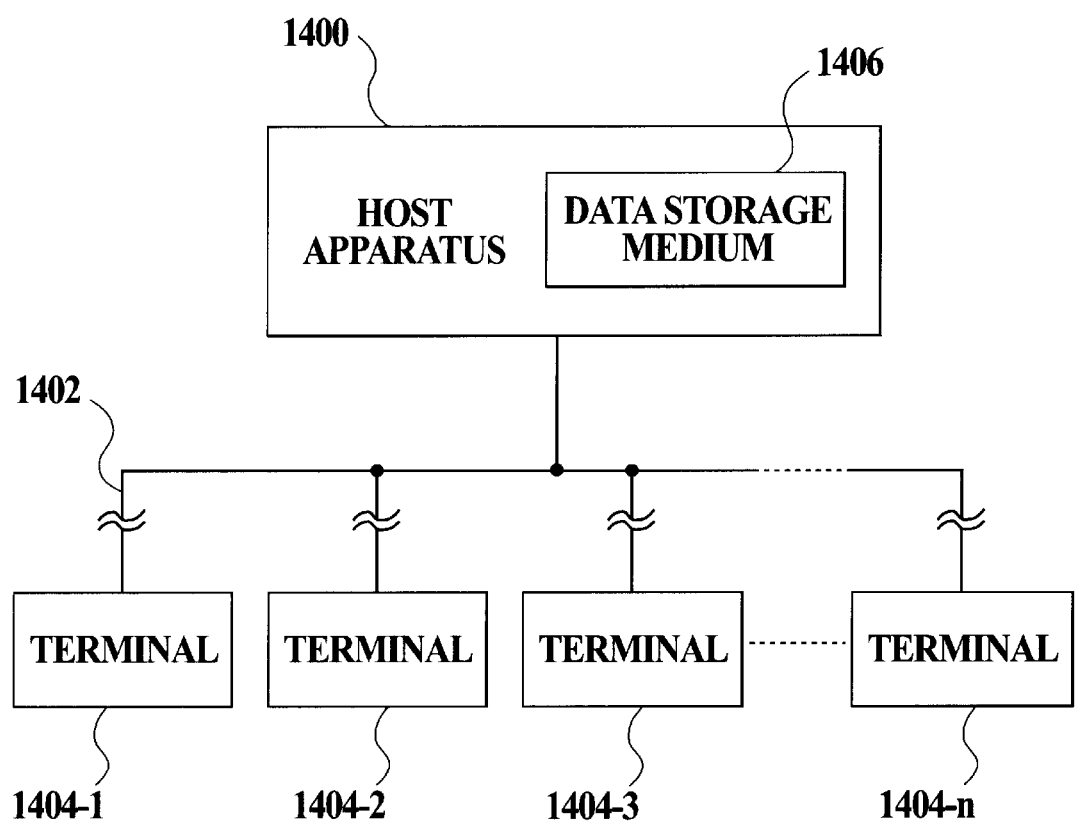
FIG. 17 is a view showing an exemplary case the present invention is applied to a network system.

FIG. 17 shows an exemplary case the present invention is applied to a game system comprising a host apparatus 1400 and terminals 1404-1 to 1404-n connected to the host apparatus 1400 through a network 1402.

In FIG. 17, the game data 42 is stored in a data storage medium 1406, for example, such as a magnetic disk device, a magnetic tape device, a memory and other medium, which can be controlled by the host apparatus 1400.

In case each of the terminals 1404-1 to 1404-n can generate game images and game sounds with standing alone, the host apparatus 1400 distributes the game program and so on for generating game images and game sounds, to the terminals 1404-1 to 1404-n, through the communication line 1402. On the other hand, in case each of the terminals 1404-1 to 1404-n cannot generate game images and game sounds with standing alone, the host apparatus 1400 generates game images and game sounds, and distributes them to the terminals 1404-1 to 1404-n. Therefore, each terminal outputs the game images and the game sounds.

In case of the structure shown in FIG. 17, means of the present invention may be distributed among and performed by the host apparatus 1400 and the terminals 1404-1 and 1404-n. Further, the above-described stored data for performing means of the present invention may be distributed among and stored in the host apparatus 1400 and the terminals 1404-1 and 1404-n.

Further, the terminal connected to the host apparatus 1400 through the communication line 1402 may be not only the above-described consumer game machine but also a portable terminal, a portable telephone and so on, such as a personal computer, an arcade game machine, a PDA and so on. In case the arcade game machine is connected to the host apparatus 1400 through the communication line 1402, the terminal may be a portable data storage medium (for example, a memory card and a portable game machine) which can exchange data with the arcade game machine and the consumer game machine.

The present invention has been explained according to the above-described embodiment wherein the present invention is applied to the fighter plane game (flight simulator), and in particular, the smoke image is generated with the trail so as to follow the missile. However, it should also be understood that the present invention is not limited to the embodiment.

Further, the present invention has been explained according to the above-described embodiment wherein the arrangement position of the particle system object group is the displacement point or the interpolation point, the arrangement number of the particle system objects provided at one displacement point or one interpolation point is "1", and the polygons (smoke polygons) are generated at the displacement point and the interpolation point which are representative points of the polygons. However, it should also be understood that the present invention is not limited to the embodiment and various changes and modifications may be made to the invention without departing from the gist thereof.

Figure 18A:
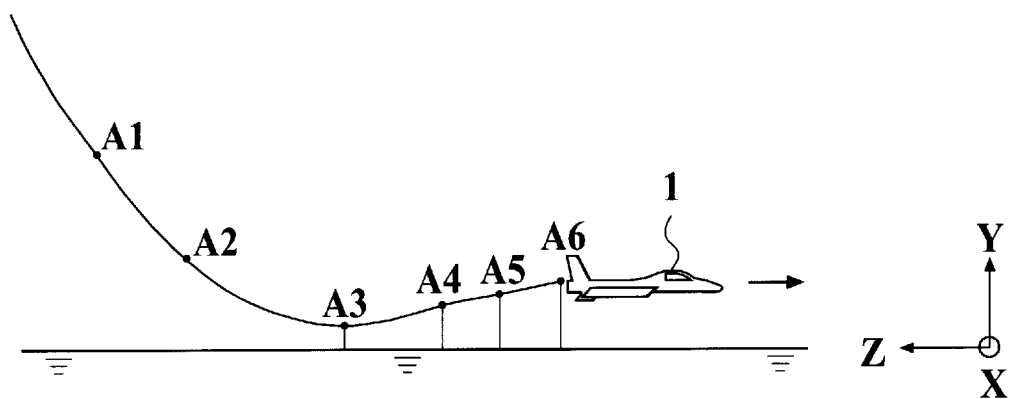
FIG. 18A is a side view showing an exemplary state a fighter plane to which the present invention is applied makes a steep descent.
Figure 18B:
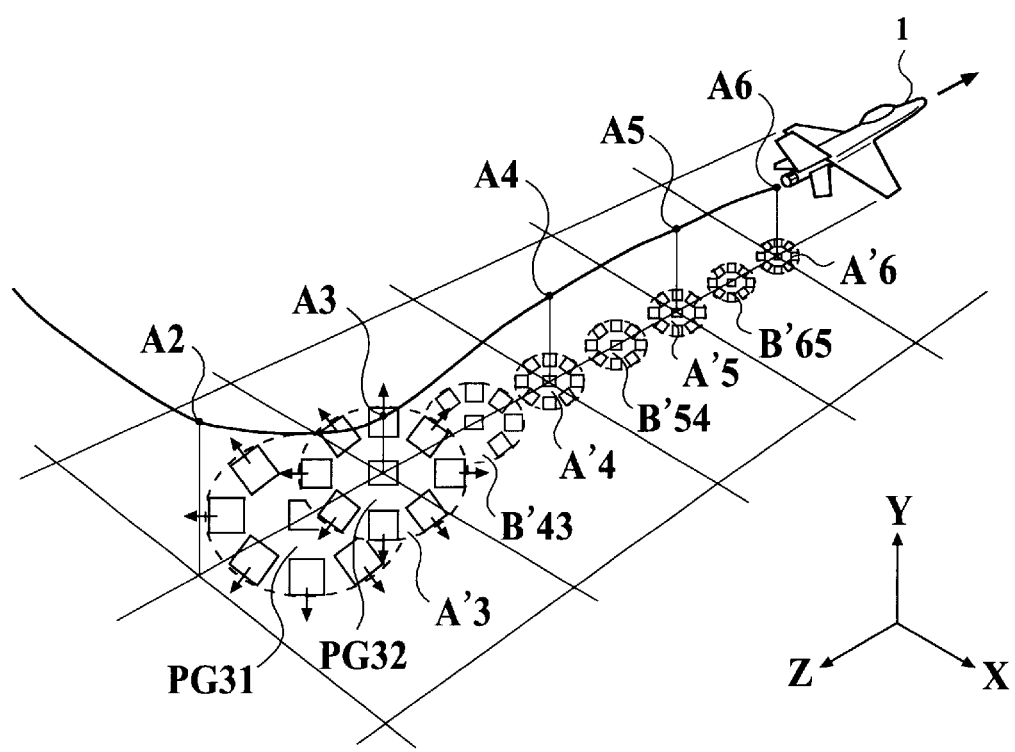
FIG. 18B is a perspective bird's-eyes view showing the state shown in FIG. 18A.

For example, FIGS. 18A and 18B are views showing the state the present invention is applied to the case the fighter plane (moving object) makes a steep descent for a water surface and flies on just the water surface. Herein, the present invention is applied to the image generation of bubbles generated when waves have risen on the water surface according to the pressure change caused by the fighter plane. The polygons are provided on the water surface along the trail of the fighter plane, and the bubble texture is mapped on each polygon. Thereby, the bubbles are represented.

More specifically, as shown in FIG. 18A, the displacement point determination unit 222 determines the displacement points "A" like the above-described embodiment. In case some of the displacement points "A" are provided within a predetermined distance from the water surface, as shown in FIG. 18B, the displacement point determination unit 222 projects the displacement points "A" which are provided within the predetermined distance, on the water surface, and calculates coordinates of the projected displacement points "A'".

Each projected displacement point "A'" has a speed composed of random directional speed components along the water surface. The random directional speed components correspond to the missile flight directional speed component and the substantially vertical directional speed component which represent the flow of the wind and so on according to the above-described embodiment, and represent factors externally influencing the bubbles, such as a fluctuation of the water surface, a current of a tide and so on.

When the particle system object group move unit 224 calculates coordinates of interpolation points "B" on the basis of the projected displacement points "A'", the particle system object groups are generated and provided at the projected displacement points "A'" and the interpolation points "B".

The particle system object group move unit 224 determines the number of particle system object groups or particle system objects (bubble polygons) constituting the particle system object group, the size of the particle system object group at the initial arrangement and so on, according to the speed and the altitude from the water surface of the fighter plane.

For example, at the position of the projected displacement point "A'3" as shown in FIG. 18B, because of the steep descent, the fighter plane flies at highest speed and at the lowest altitude. Therefore, two substantially circular particle system object groups PG 31 and PG 32 are provided at the same time. Accordingly, because large quantities of bubbles are generated, it is possible to represent a power of the steep descent realistically.

Further, at the position of the projected displacement points "A'4" to "A'6", because the fighter plane 1 flies at stable speed and at the stable altitude, the particle system object groups including the almost same number of polygons are provided.

Further, the particle system object group move unit 224 enlarges the size of the particle system object group provided on the water surface as time passes. Therefore, it is possible to realistically represent as if the bubbles were diffused. In the case, for example, a plurality of polygons constituting the particle system object group are provided so as to separate from the center as time passes, and the size of each polygon is enlarged as time passes.

Furthermore, in case the displacement point control data 531 further includes a transparency, the transparency may increase as time passes, for example, according to an α value. In the case, it is possible to represent the bubbles disappearing little by little.

Figure 19A:
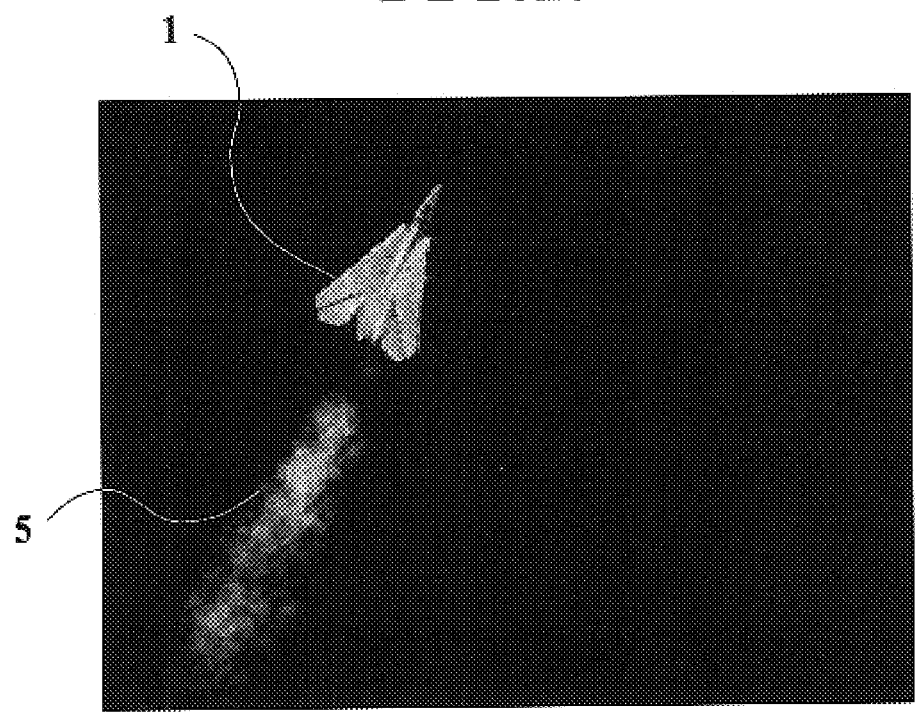
FIGS. 19A and 19B are exemplary game screens of the state shown in FIGS. 18A and 18B.
Figure 19B:
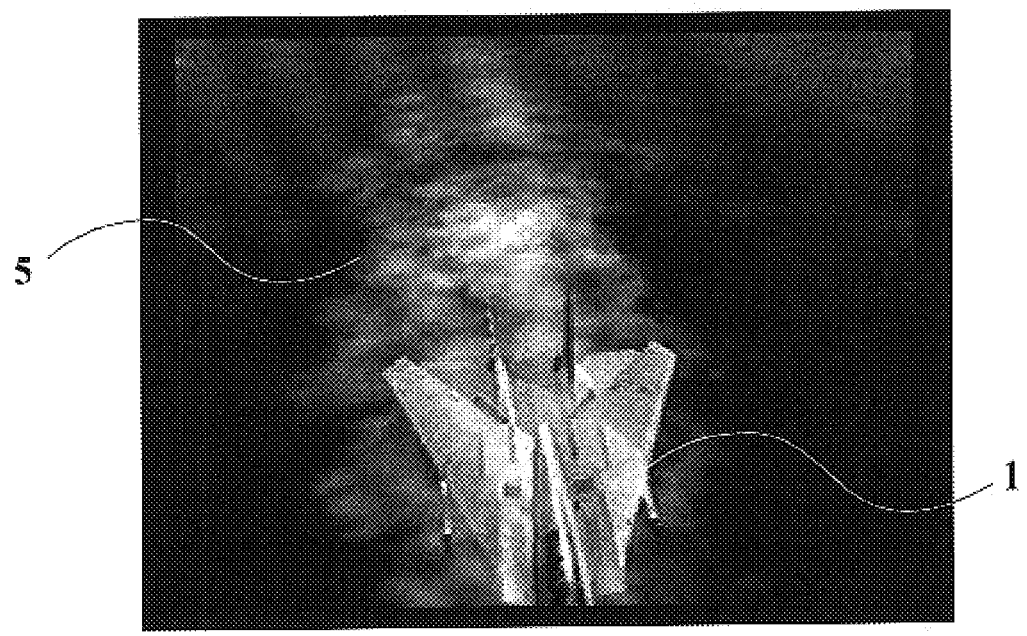

FIGS. 19A and 19B are views showing exemplary game screens generated as described above. In FIGS. 19A and 19B, bubbles 5 are represented realistically behind the fighter plane 1.

Figure 20A:
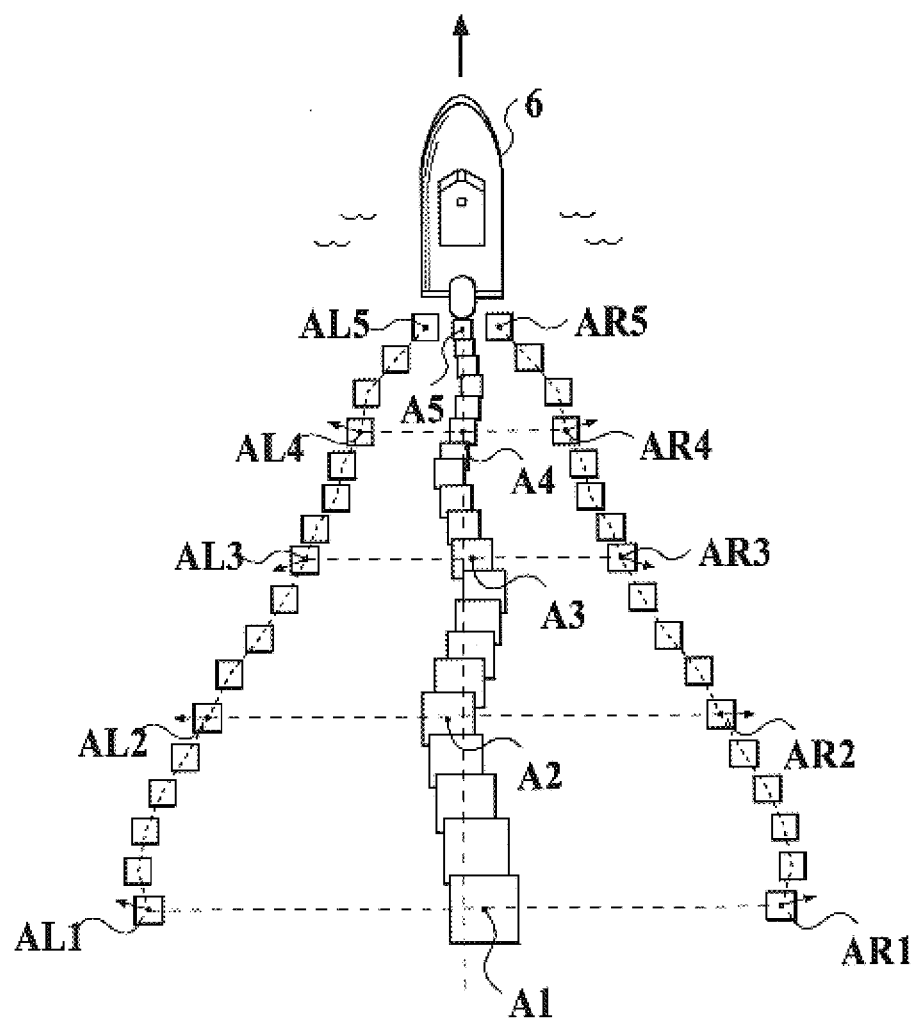
FIG. 20A is a bird's-eyes view showing an exemplary state a motor boat to which the present invention is applied sails.

As another example, as shown in FIG. 20A, the present invention may be applied to a motor boat 6 sailing on the water surface and stern waves.

In case the moving object is the motor boat 6, the displacement point determination unit 222 generates the displacement pints "A" on the sailing course of the motor boat 6 on the water surface. Then, the displacement point determination unit 222 determines auxiliary displacement points "AR" and "AL" at right and left sides of the displacement points "A" in the sailing direction of the motor boat 6. The displacement points "A" and the auxiliary displacement points "AR" and "AL" have speeds composed of random directional speed components in the direction of the water surface. In particular, the auxiliary displacement points "AR" and "AL" have accelerations in a substantially right direction and a substantially left direction to the sailing direction, respectively.

Figure 20B:
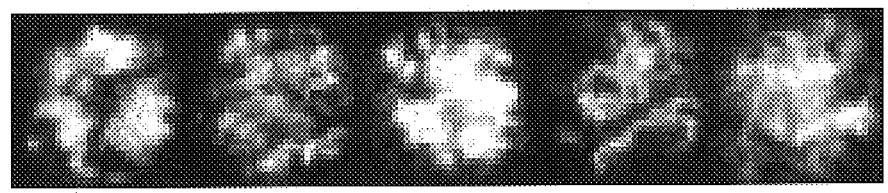
FIG. 20B is a view showing an example of bubble textures according to an embodiment of the present invention.

The displacement point move unit 223 moves the displacement points "A" and the auxiliary displacement points "AR" and "AL" as time passes. Then, when the particle system object group move unit 224 determines interpolation points "B", "BR" and "BL" which are not shown in FIG. 20A, on the basis of the moved displacement points "A" and the moved auxiliary displacement points "AR" and "AL", respectively, the particle system object group move unit 224 provides bubble polygons at the determined points. Thereafter, the mapping unit 240 maps bubble textures of stern waves shown in FIG. 20B on the bubble polygons.

Therefore, it is possible to generate images of realistic stern waves which expand in a zigzag line rightward and leftward as time passes.

Further, because the particle system object group at the displacement point "A" expands as time passes, it is possible to realistically represent the state a large number of bubbles included in the central stern wave rise as time passes and the water surface becomes white.

Furthermore, the present invention can be applied not only to the fighter plane game (flight simulator) but also to various games, for example, a game of a plane except the fighter plane, a space ship game, a racing game, an action game, a robot versus fighting game, a sports game, a shooting game, a role playing game and so on.

Figure 21:
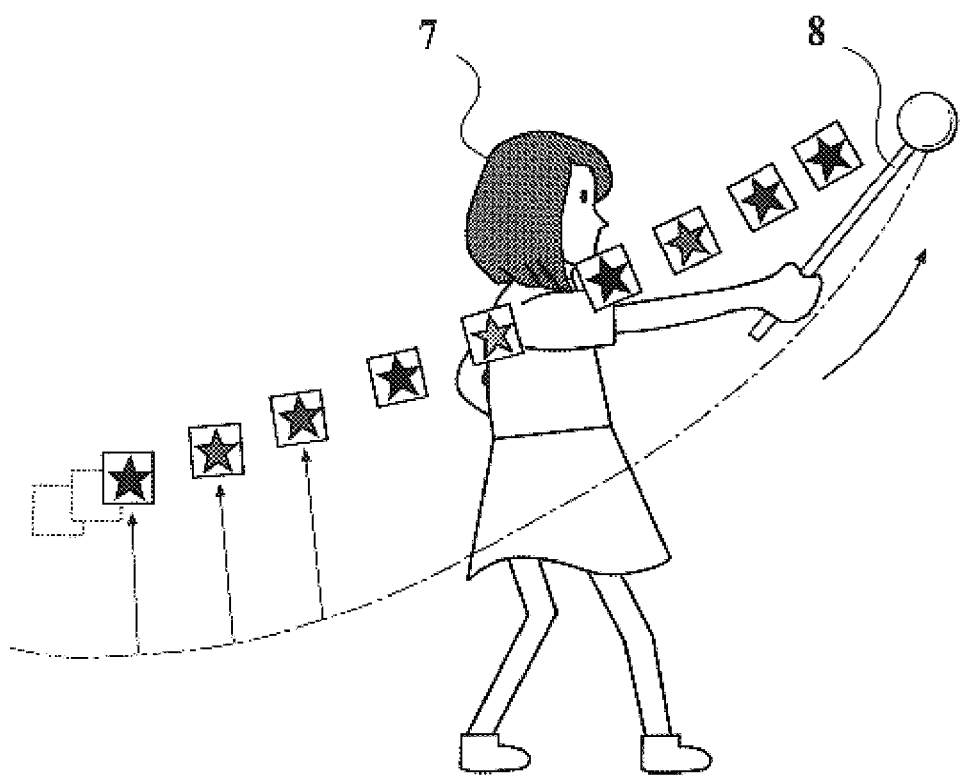
FIG. 21 is a side view showing an exemplary state a girl waves a magic wand to which the present invention is applied.

For example, as shown in FIG. 21, the present invention can be applied to a role playing game wherein when a girl character 7 waves a magic wand 8, stars are generated so as to have a lasting twinkling effect from a top of the magic wand 8.

In the above-described case, like the smoke of the missile, the displacement point determination unit 222 determines the displacement points "A" which are not shown in FIG. 21, on the course of the top of the magic wand 8. Then, the particle system object group move unit 224 determines the interpolation points "B" which are not shown in FIG. 21, on the basis of the displacement points "A". Thereafter, when the particle system object group move unit 224 provides star polygons at the displacement points "A" and the interpolation points "B", the mapping unit 240 maps star textures on the star polygons.

Herein, the displacement point determination unit 222 further provides a brightness variable in the displacement point control data 531. Then, the particle system object group move unit 224 interpolates brightness variables of the interpolation points "B" on the basis of brightness variables of the displacement points "A", like the case of interpolating positions of the interpolation points "B" on the basis of positions of the displacement points "A". Therefore, the particle system object group move unit 224 provides the brightness to each of polygons at the displacement points "A" and the interpolation points "B".

Therefore, it is possible not only to generate and provide star polygons so as to follow the magic wand 8, but also to further provide a fantastic representation wherein the brightness of the star polygons is smoothly changed between the displacement points "A". Further, if the brightness variable is determined as a curve function of time (for example, a sine function, a Lissajou function and so on), it is possible to provide a more fantastic representation wherein the brightness of the star polygons is changed so as to wave in turn as time passes.

According to the present invention, the following effects will be indicated.

To generate image data of the particle system object group such as a cloud, a smoke, bubbles and so on, the displacement point is provided as a representative point indicating the position to which the particle system object group is moved, and moved on the basis of a random movement of a wind, a particle system object generation source or the like, as time passes. Then, the particle system object group is provided in the object space, on the basis of the position of the moved displacement point. Accordingly, it is possible to provide the particle system object group as if the particle system object group were moved on the basis of the random movement of the wind, the particle system object generation source or the like, as time passes.

Further, because only the displacement point is moved at predetermined time intervals, it is possible to generate realistic image data of a condensation trail waving in a wind, a smoke in a muddle by a rafter or the like, according to a large number of particle system objects, only in a light operation load and a little used storage capacity.

Further, because the displacement point represents not only the position of the particle system object group but also the transparency, the brightness and so on of the particle system object group as the occasion may demand, it is possible to further provide various effects of diffusing or flickering the particle system object as time passes.

Furthermore, because the number or the size of the particle system object groups, or the number or the position of the particle system objects constituting the particle system object group is changed as the occasion may demand, it is possible to represent the particle system object group in various ways and to generate more realistic image data.

The entire disclosure of Japanese Patent Application No. Tokugan 2001-94376 filed on Mar. 28, 2001 including specification, claims, drawings and summary are incorporated herein by reference in its entirety.

What is claimed is:

1. A method for generating image data of a virtual space viewed from a predetermined view point, comprising:

providing a particle system object group comprising at least one particle system object which includes a plurality of particles in the virtual space, according to a predetermined rule, continuously or intermittently;

determining a displacement point as a basis for moving the provided particle system object group, in the virtual space;

moving the determined displacement point in a predetermined direction as time passes; and moving the provided particle system object group on the basis of the moved displacement point.

2. The method as claimed in claim 1, further comprising:

providing the particle system object group so as to attach to or follow a moving object moving in the virtual space.

3. The method as claimed in claim 2, further comprising:

determining the displacement point on the basis of a position of the moving object at predetermined time intervals.

4. The method as claimed in claim 2, further comprising:

determining the predetermined direction to be at least a substantially vertical direction to a moving direction of the moving object at the displacement point, to move the displacement point in the predetermined direction.

5. The method as claimed in claim 2, further comprising:

changing at least one of providing one particle system object group or a predetermined number of particle system object groups, a size of the particle system object group, and a transparency of the particle system object group, on the basis of at least one of a position, a moving speed, a moving direction and a type of the moving object, to provide the particle system object group or the predetermined number of particle system object groups.

6. The method as claimed in claim 2, further comprising:

changing at least one of providing the particle system object group comprising one particle system object or a predetermined number of particle system objects, a position of the particle system object, a size of the particle system object, and a transparency of the particle system object, on the basis of at least one of a position, a moving speed, a moving direction and a type of the moving object, to provide the particle system object group.

7. The method as claimed in claim 2, further comprising:

changing at least one of the predetermined direction and a moving speed of the displacement point, on the basis of at least one of a moving speed, a moving direction, a movement and a type of the moving object, to move the displacement point.

8. The method as claimed in claim 2, further comprising:

moving the particle system object group on the basis of the displacement point, according to a moving direction of the moving object.

9. The method as claimed in claim 1, further comprising:

changing at least one of a size and a transparency of the particle system object group as time passes.

10. The method as claimed in claim 1, further comprising:

changing at least one of a position, a size and a transparency of the particle system object of the particle system object group as time passes.

11. The method as claimed in claim 1, further comprising:

turning the particle system object which is formed in a board, in a predetermined direction based on the predetermined view point.

12. An apparatus adapted to carry out the method as claimed in claim 1.

13. The apparatus as claimed in claim 12, further comprising a game execution unit for executing a predetermined game according to the image data generated.

14. A storage medium having a program recorded thereon, when the program is loaded onto an operating apparatus, the program making the operating apparatus execute the method as claimed in claim 1.

15. A program, when the program is loaded onto an operating apparatus, to make the operating apparatus execute the method as claimed in claim 1.

16. A program product comprising a storage medium having a program recorded thereon, when the program is loaded onto an operating apparatus, the program making the operating apparatus execute the method as claimed in claim 1.

17. A method for generating image data of a virtual space viewed from a predetermined view point, comprising:

providing a particle system object group representing a particle system of a cloud, so as to attach to or follow a moving object moving in the virtual space, continuously or intermittently;

changing a position of the provided particle system object group as time passes; and stopping representing the particle system object group or deleting the particle system object group among the provided particle system object group including the particle system object group of which position is changed, when the particle system object group is provided for a predetermined time.

18. An apparatus adapted to carry out the method as claimed in claim 17.

19. The apparatus as claimed in claim 18, further comprising a game execution unit for executing a predetermined game according to the image data generated.

20. A storage medium having a program recorded thereon, when the program is loaded onto an operating apparatus, the program making the operating apparatus execute the method as claimed in claim 17.

21. A program, when the program is loaded onto an operating apparatus, to make the operating apparatus execute the method as claimed in claim 17.

22. A program product comprising a storage medium having a program recorded thereon, when the program is loaded onto an operating apparatus, the program making the operating apparatus execute the method as claimed in claim 17.

23. A method for generating image data of a virtual space viewed from a predetermined view point, comprising:

providing a particle system object group representing a particle system of a cloud or a bubble, so as to attach to or follow a moving object moving in the virtual space, continuously or intermittently; and moving the provided particle system object group in a moving direction at a moving speed, as time passes, while changing at least one of the moving direction and the moving speed of the provided particle system object group according to a movement of the moving object.

24. An apparatus adapted to carry out the method as claimed in claim 23.

25. The apparatus as claimed in claim 24, further comprising a game execution unit for executing a predetermined game according to the image data generated.

26. A storage medium having a program recorded thereon, when the program is loaded onto an operating apparatus, the program making the operating apparatus execute the method as claimed in claim 23.

27. A program, when the program is loaded onto an operating apparatus, to make the operating apparatus execute the method as claimed in claim 23.

28. A program product comprising a storage medium having a program recorded thereon, when the program is loaded onto an operating apparatus, the program making the operating apparatus execute the method as claimed in claim 23.

29. A method for generating image data of a virtual space viewed from a predetermined view point, comprising:
providing a particle system object group representing a particle system of a bubble, so as to attach to or follow a moving object moving in the virtual space, continuously or intermittently;
changing a position of the provided particle system object group as time passes; and
stopping representing the particle system object group or deleting the particle system object group among the provided particle system object group including the particle system object group of which position is changed, when the particle system object group is provided for a predetermined time.

30. An apparatus adapted to carry out the method as claimed in claim 29.

31. The apparatus as claimed in claim 30, further comprising a game execution unit for executing a predetermined game according to the image data generated.

32. A storage medium having a program recorded thereon, when the program is loaded onto an operating apparatus, the program making the operating apparatus execute the method as claimed in claim 29.

33. A program, when the program is loaded onto an operating apparatus, to make the operating apparatus execute the method as claimed in claim 29.

34. A program product comprising a storage medium having a program recorded thereon, when the program is loaded onto an operating apparatus, the program making the operating apparatus execute the method as claimed in claim 29.

35. A method for generating image data of a virtual space viewed from a predetermined view point, comprising:
providing a particle system object group comprising at least one particle system object which includes a plurality of particles in the virtual space, according to a predetermined rule, continuously or intermittently;
determining a displacement point as a basis for moving the provided particle system object group, in the virtual space;
moving the determined displacement point in a predetermined direction as time passes;
moving the provided particle system object group on the basis of the moved displacement point; and
changing a size of each provided particle system object group and diffusing the provided particle system object group of which size is changed as time passes.

36. The method as claimed in claim 35, further comprising:
providing the particle system object group so as to attach to or follow a moving object moving in the virtual space.

37. The method as claimed in claim 36, further comprising:
determining the displacement point on the basis of a position of the moving object at predetermined time intervals.

38. The method as claimed in claim 36, further comprising:
determining the predetermined direction to be at least a substantially vertical direction to a moving direction of the moving object at the displacement point, to move the displacement point in the predetermined direction.

39. The method as claimed in claim 36, further comprising:
changing at least one of providing one particle system object group or a predetermined number of particle system object groups, a size of the particle system object group, and a transparency of the particle system object group, on the basis of at least one of a position, a moving speed, a moving direction and a type of the moving object, to provide the particle system object group or the predetermined number of particle system object groups.

40. The method as claimed in claim 36, further comprising:
changing at least one of providing the particle system object group comprising one particle system object or a predetermined number of particle system objects, a position of the particle system object, a size of the particle system object, and a transparency of the particle system object, on the basis of at least one of a position, a moving speed, a moving direction and a type of the moving object, to provide the particle system object group.

41. The method as claimed in claim 36, further comprising:
changing at least one of the predetermined direction and a moving speed of the displacement point, on the basis of at least one of a moving speed, a moving direction, a movement and a type of the moving object, to move the displacement point.

42. The method as claimed in claim 36, further comprising:
moving the particle system object group on the basis of the displacement point, according to a moving direction of the moving object.

43. The method as claimed in claim 35, further comprising:
changing a transparency of the particle system object group as time passes.

44. The method as claimed in claim 35, further comprising:
changing at least one of a position, a size and a transparency of the particle system object of the particle system object group as time passes.

45. The method as claimed in claim 35, further comprising:
turning the particle system object which is formed in a board, in a predetermined direction based on the predetermined view point.

46. An apparatus adapted to carry out the method as claimed in claim 35.

47. The apparatus as claimed in claim 46, further comprising a game execution unit for executing a predetermined game according to the image data generated.

48. A storage medium having a program recorded thereon, when the program is loaded onto an operating apparatus, the program making the operating apparatus execute the method as claimed in claim 35.

49. A program, when the program is loaded onto an operating apparatus, to make the operating apparatus execute the method as claimed in claim 35.

50. A program product comprising a storage medium having a program recorded thereon, when the program is loaded onto an operating apparatus, the program making the operating apparatus execute the method as claimed in claim 35.

* * * * *